United States Patent
Abotabl et al.

(10) Patent No.: US 12,193,039 B2
(45) Date of Patent: Jan. 7, 2025

(54) DYNAMIC INDICATION OF EMISSION SUPPRESSION LEVELS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 17/457,002

(22) Filed: Nov. 30, 2021

(65) Prior Publication Data

US 2023/0171798 A1   Jun. 1, 2023

(51) Int. Cl.
*H04W 72/54* (2023.01)
*H04W 72/1268* (2023.01)
*H04W 72/23* (2023.01)

(52) U.S. Cl.
CPC ....... *H04W 72/54* (2023.01); *H04W 72/1268* (2013.01); *H04W 72/23* (2023.01)

(58) Field of Classification Search
CPC ............... H04W 72/54; H04W 72/115; H04W 72/1268; H04W 72/23; H04W 28/18; H04L 1/0025; H04L 5/0053; H04L 5/0091
See application file for complete search history.

(56) References Cited

U.S. PATENT DOCUMENTS

| | | | | |
|---|---|---|---|---|
| 11,729,718 | B2* | 8/2023 | Nam | H04L 1/0038 370/318 |
| 11,764,936 | B2* | 9/2023 | Lei | H04L 5/1423 370/329 |
| 2017/0070961 | A1* | 3/2017 | Bharadwaj | H04W 52/228 |
| 2019/0289502 | A1* | 9/2019 | Abedini | H04W 72/20 |
| 2020/0029315 | A1* | 1/2020 | Lin | H04W 52/0245 |

(Continued)

FOREIGN PATENT DOCUMENTS

| WO | 2020243005 A1 | 12/2020 |
|---|---|---|
| WO | 2021126497 A1 | 6/2021 |

OTHER PUBLICATIONS

International Search Report and Written Opinion—PCT/US2022/051293—ISA/EPO—Feb. 20, 2023.

*Primary Examiner* — Chi H Pham
*Assistant Examiner* — Vladislav Y Agureyev
(74) *Attorney, Agent, or Firm* — Paul M. McAdams; Procopio, Cory, Hargreaves & Savitch LLP

(57) ABSTRACT

Apparatus, methods, and computer-readable media for facilitating dynamic indication of emission suppression levels are disclosed herein. An example method for wireless communication at a first network node includes transmitting, to a second network node, first information indicating at least one emission suppression capability of the first network node. The example method also includes receiving, after the first information is transmitted to the second network node, second information indicating a first emission suppression level associated with a scheduled uplink transmission. The example method also includes transmitting the scheduled uplink transmission based on the first emission suppression level.

32 Claims, 16 Drawing Sheets

Full-duplex Base Station + Full-duplex UE

(56) References Cited

U.S. PATENT DOCUMENTS

| | | | |
|---|---|---|---|
| 2020/0304183 A1* | 9/2020 | Chen | H04L 1/00 |
| 2020/0351930 A1* | 11/2020 | Luo | H04W 24/08 |
| 2022/0124786 A1* | 4/2022 | Mukherjee | H04L 5/0094 |
| 2023/0116936 A1* | 4/2023 | Abotabl | H04W 52/0229 |
| | | | 370/329 |
| 2023/0291534 A1* | 9/2023 | Zhou | H04W 74/0841 |
| 2023/0345386 A1* | 10/2023 | Abotabl | H04W 52/143 |
| 2024/0073800 A1* | 2/2024 | Abotabl | H04W 72/23 |
| 2024/0107530 A1* | 3/2024 | Tamrakar | H04L 5/0044 |
| 2024/0251420 A1* | 7/2024 | Yang | H04W 4/40 |

\* cited by examiner

800

| Indicator | Emission Suppression Level |
|---|---|
| 01 | 5 dB |
| 02 | 7 dB |
| 03 | 10 dB |
| N/A | 2 dB |

| Indicator | Emission Suppression Level |
|---|---|
| Infinite gap | 5 dB |
| 40 RBs | 7 dB |
| 20 Rbs | 10 dB |
| N/A | 2 dB |

FIG. 8B

DYNAMIC INDICATION OF EMISSION SUPPRESSION LEVELS

TECHNICAL FIELD

The present disclosure relates generally to communication systems, and more particularly, to wireless communications including full-duplex communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first network node. An example apparatus may transmit, to a second network node, first information indicating at least one emission suppression capability of the first network node. The example apparatus may also receive, after the first information is transmitted to the second network node, second information indicating a first emission suppression level associated with a scheduled uplink transmission. Additionally, the example apparatus may transmit the scheduled uplink transmission based on the first emission suppression level.

In another aspect of the disclosure, a method, a computer-readable medium, and an apparatus are provided for wireless communication at a first network node. An example apparatus may receive, from a second network node, first information indicating at least one emission suppression capability of the second network node. Additionally, the example apparatus may transmit, after the first information is received from the second network node, second information indicating a first emission suppression level associated with a scheduled uplink transmission. The example apparatus may also receive the scheduled uplink transmission based on the first emission suppression level.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8A is an example configuration mapping indicators to respective emission suppression levels, in accordance with the teachings disclosed herein.

FIG. 8B is an example configuration mapping resource gap indicators to respective emission suppression levels, in accordance with the teachings disclosed herein.

DETAILED DESCRIPTION

Figure 1:
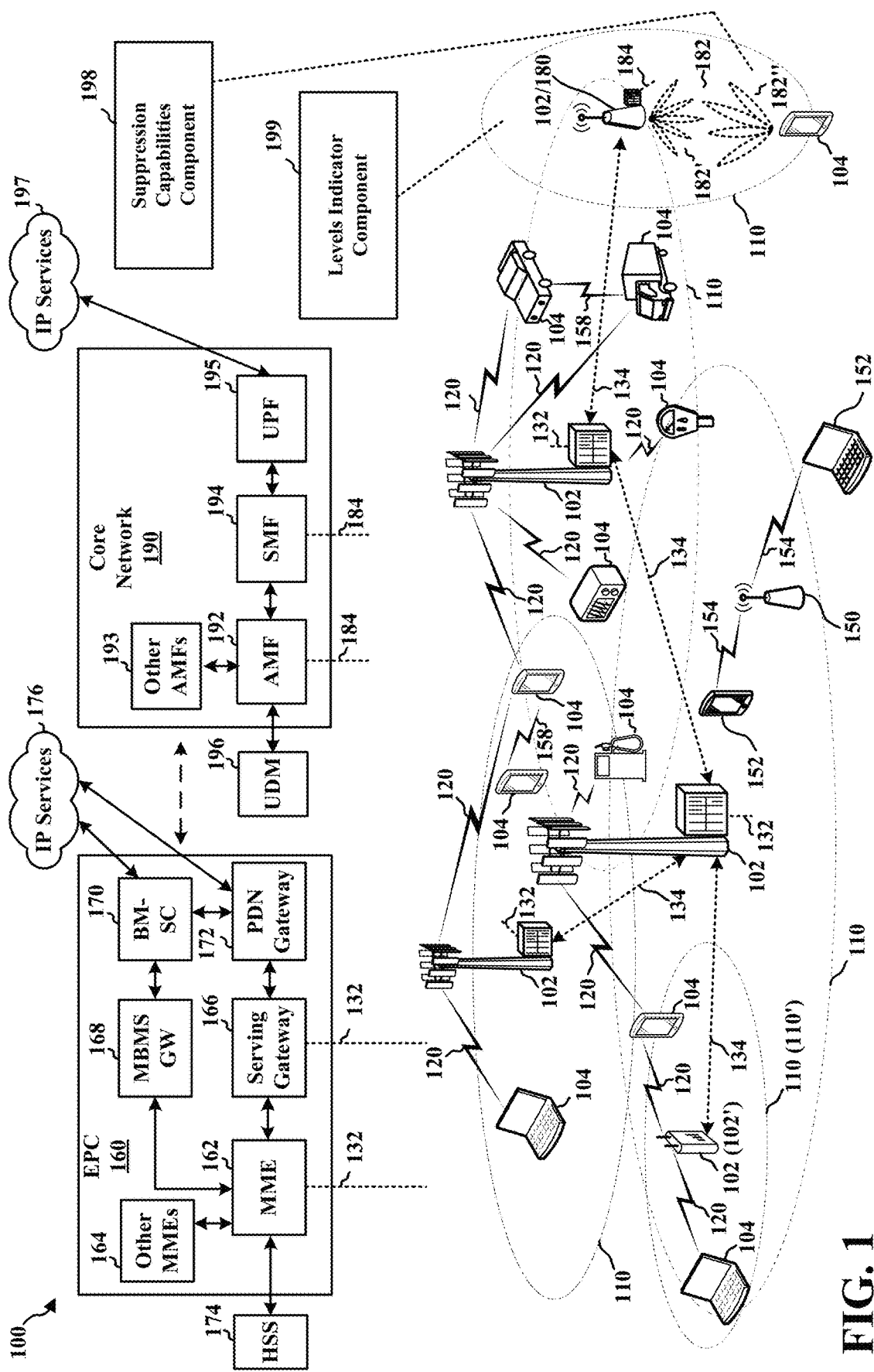
FIG. 1 is a diagram illustrating an example of a wireless communications system and an access network.

Full-duplex communication enables a communication device to perform transmission and reception at a same time (e.g., using overlapping time resource) and over a same frequency band. For example, a communication device (e.g., a UE or a base station) may use a first subset of frequency resources at a first time to receive a first transmission and a second subset of frequency resources at the first time to transmit a second transmission.

Full-duplex communication may reduce latency. Full-duplex communication may improve spectrum efficiency, e.g., spectrum efficiency per UE, with respect to the spectral efficiency of half-duplex communication that supports transmission or reception of information in one direction at a time without overlapping uplink and downlink communication. Full-duplex communication may enable more efficient use of wireless resources. In some examples, when employing full-duplex communication, interference (or leakage) between signals may occur. For example, a guard band may be relatively small and, thus, leakage from uplink resources may spill through the guard band to downlink resources and/or leakage from the downlink resources may spill through the guard band to the uplink resources.

While configuring the UE to satisfy aggressive emission suppression levels may reduce leakage in general scenarios, satisfying such emission suppression levels may be resource intensive at the UE with respective to power and/or energy. Aspects disclosed herein provide techniques for indicating emission suppression levels depending on a transmission scenario that enables the UE to conserve power resources. For example, techniques disclosed herein may dynamically indicate an emission suppression level that the UE is to satisfy for an uplink transmission. In some examples, the UE may receive the indication of the emission suppression level with a grant for an uplink transmission. For example, when the UE receives an uplink grant, downlink control information (DCI) scheduling the uplink grant may indicate the emission suppression level to be applied to the uplink grant.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and use cases are described in this application by illustration to some examples, additional or different aspects, implementations, and/or use cases may come about in many different arrangements and scenarios. Aspects described herein may be implemented across many differing platform types, devices, systems, shapes, sizes, and packaging arrangements. For example, aspects, implementations and/or use cases may come about via integrated chip implementations and/or non-module-component based devices (e.g., end-user devices, vehicles, communication devices, computing devices, industrial equipment, retail/purchasing devices, medical devices, artificial intelligence (AI)-enabled devices, etc.), may range a spectrum from chip-level or modular components to non-modular, non-chip-level implementations and further to aggregate, distributed, or original equipment manufacturer (OEM) devices or systems incorporating one or more techniques described herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). The techniques described herein may be practiced in a wide variety of devices, chip-level components, systems, distributed arrangements, aggregated or disaggregated components, end-user devices, etc. of varying sizes, shapes, and constitution.

As described herein, a node, which may be referred to as a node, a network node, or a wireless node, may be a base station, a UE, a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. In this example, consistent with this disclosure, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a first one or more components, a first processing entity, or the like.

FIG. 1 is a diagram illustrating an example of a wireless communications system and an access network 100 including base stations 102 and 180 and UEs 104. The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, a first network node, such as a UE 104, in communication with a second network node, such as a base station, may be configured to manage one or more aspects of wireless communication by applying different emission suppression levels for uplink transmission based on indicators associated with uplink grants. For example, the UE 104 may include a suppression capabilities component 198 configured transmit, to a second network node, first information indicating at least one emission suppression capability of the first network node. Additionally, the example suppression capabilities component 198 may be configured to receive, after the first information is transmitted to the second network node, second information indicating a first emission suppression level associated with a scheduled uplink transmission. The example suppression capabilities component 198 may also be configured to transmit the scheduled uplink transmission based on the first emission suppression level.

In another configuration, a first network node, such as the base stations 102 and 180, may be configured to manage or more aspects of wireless communication by facilitating indicating an emission suppression level to apply with an uplink transmission associated with an uplink grant. For example, the base stations 102/180 may include a levels indicator component 199 configured to receive, from a second network node, first information indicating at least one emission suppression capability of the second network node. Additionally, the example levels indicator component 199 may be configured to transmit, after the first information is received from the second network node, second information indicating a first emission suppression level associated with a scheduled uplink transmission. The example levels indicator component 199 may also be configured to receive the scheduled uplink transmission based on the first emission suppression level.

The aspects presented herein may enable a first network node (e.g., a UE) to receive an indicator and apply an emission suppression level to an uplink transmission based on the indicator, which may which may facilitate reducing resource use at the first network node and may also improve communication performance, for example, by reducing interference between full-duplex communications.

Although the following description provides examples directed to 5G NR, the concepts described herein may be applicable to other similar areas, such as LTE, LTE-A, CDMA, GSM, and/or other wireless technologies, in which a first network node may communicate using full-duplex and may incur leakage across channels.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
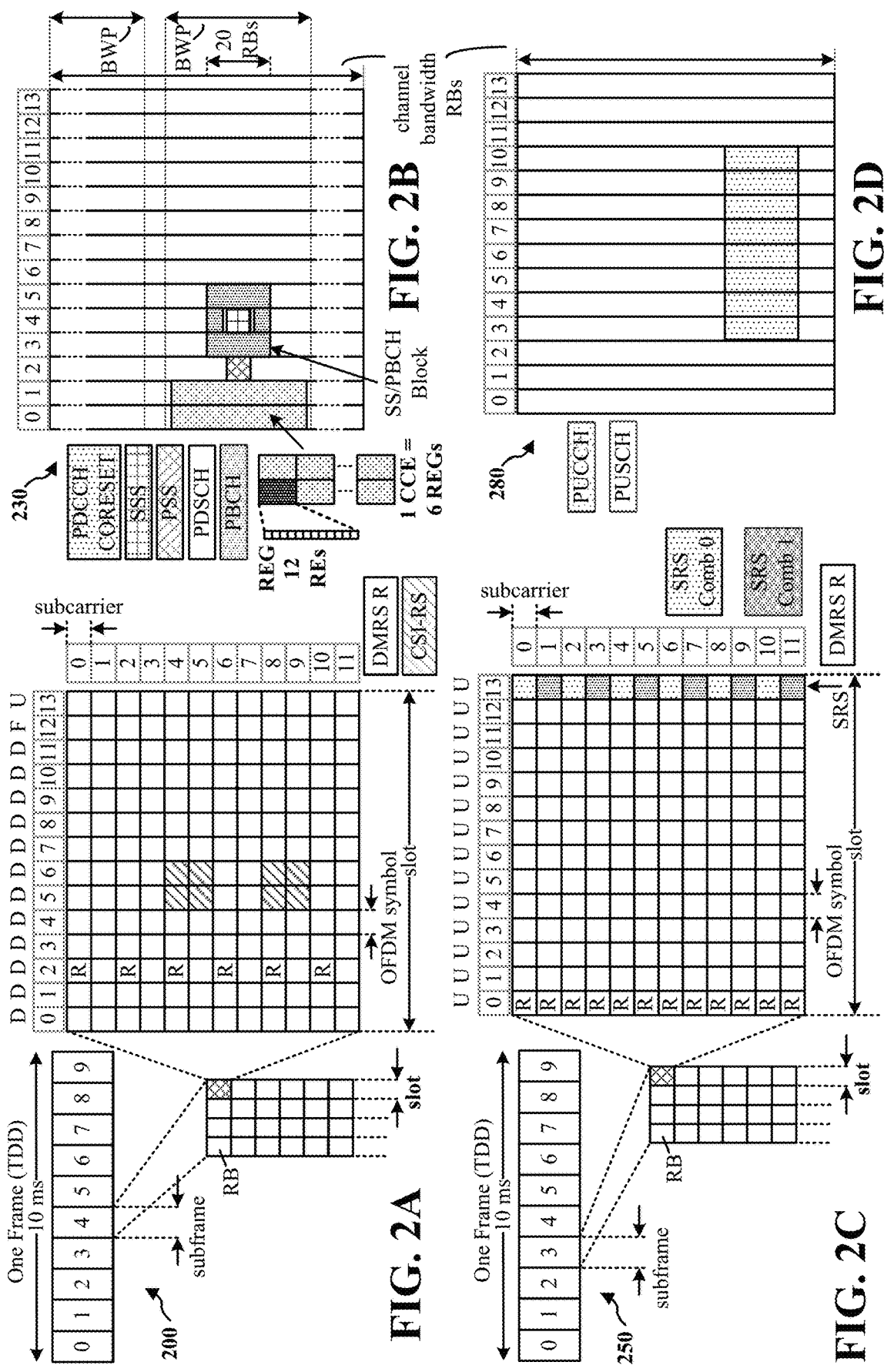
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>Δf = $2^μ \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^μ$ slots/subframe. The subcarrier spacing may be equal to $2^μ*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
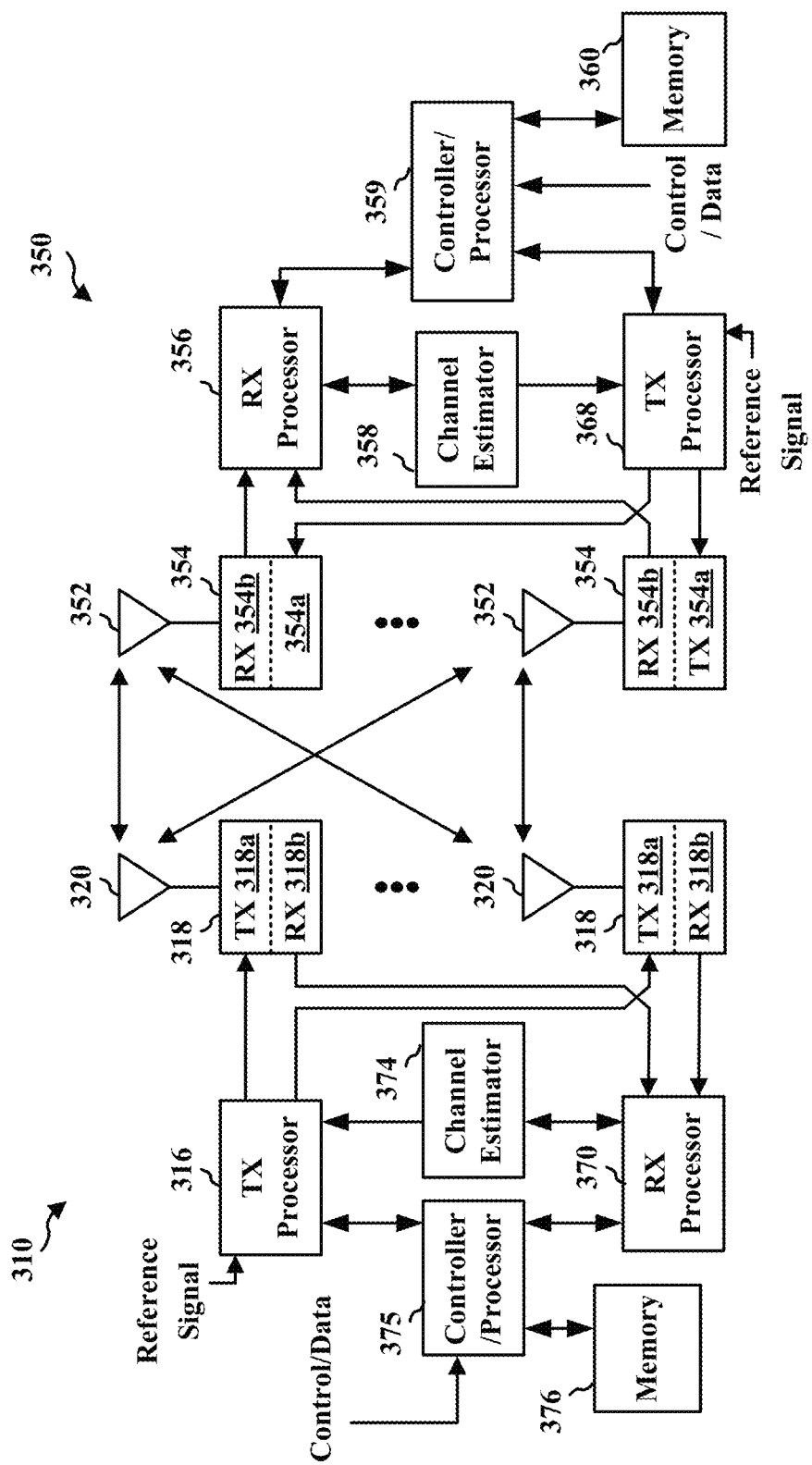
FIG. 3 is a diagram illustrating an example of a base station and a UE in an access network.

FIG. 3 is a block diagram that illustrates an example of a first wireless device that is configured to exchange wireless communication with a second wireless device. In the illustrated example, the first wireless device may include a base station 310, the second wireless device may include a UE 350, and the base station 310 may be in communication with the UE 350 in an access network. As shown in FIG. 3, the base station 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting;

PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate a radio frequency (RF) carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the suppression capabilities component 198 of FIG. 1.

At least one of the TX processor 316, the RX processor 370, and the controller/processor 375 may be configured to perform aspects in connection with the levels indicator component 199 of FIG. 1.

Full-duplex communication enables a communication device to perform transmission and reception at a same time (e.g., using overlapping time resource) and over a same frequency band. For example, a communication device (e.g., a UE or a base station) may use a first subset of frequency resources at a first time to receive a first transmission and a second subset of frequency resources at the first time to transmit a second transmission.

Full-duplex communication may reduce latency. Full-duplex communication may improve spectrum efficiency, e.g., spectrum efficiency per UE, with respect to the spectral efficiency of half-duplex communication that supports transmission or reception of information in one direction at a time without overlapping uplink and downlink communication. Full-duplex communication may enable more efficient use of wireless resources.

Figure 4A:
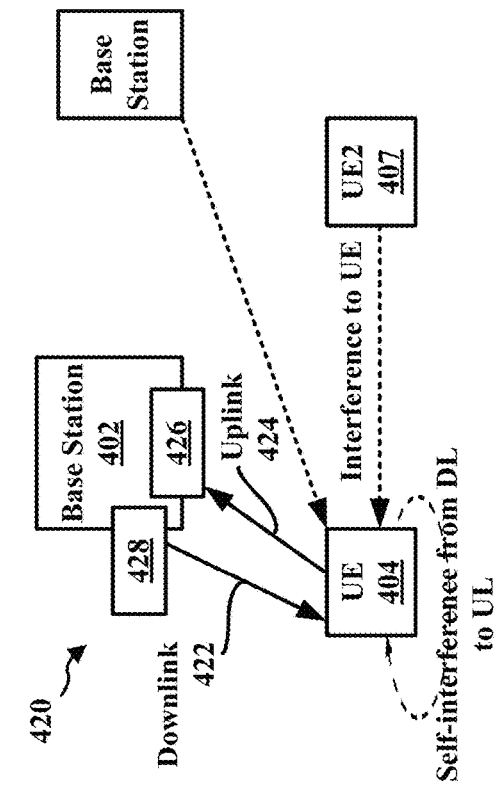
FIG. 4A illustrates a first example scenario including a base station that is capable of full-duplex communication, in accordance with various aspects of the present disclosure.
Figure 4B:
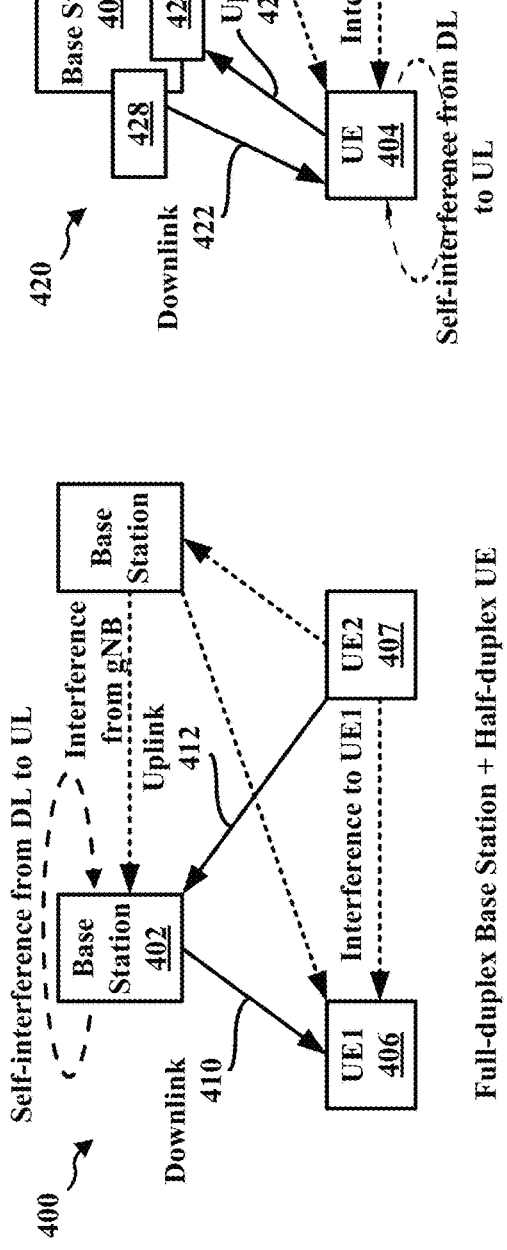
FIG. 4B illustrates a second example scenario in which a base station and a UE are both capable of full-duplex communication, in accordance with various aspects of the present disclosure.
Figure 4C:
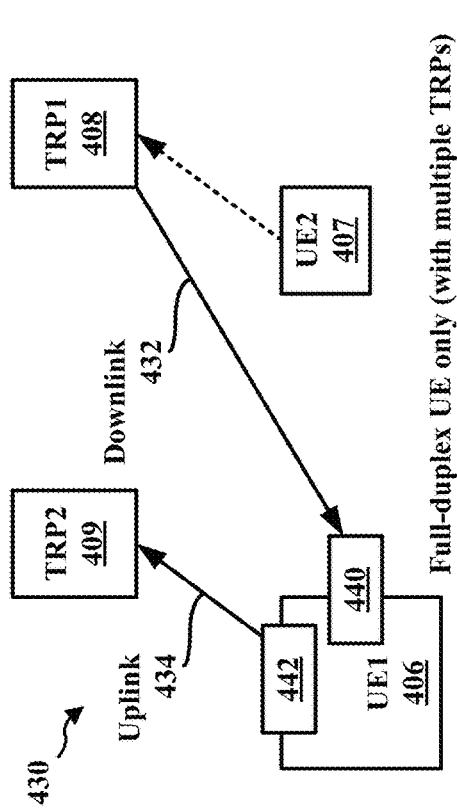
FIG. 4C illustrates a third example scenario in which a UE is capable of full-duplex communication, in accordance with various aspects of the present disclosure.

FIGS. 4A, 4B, and 4C illustrate example communication flows between wireless devices including at least one full-duplex capable communication device. For example, FIG. 4A illustrates a first example scenario 400 including a base station 402 that is capable of full-duplex communication. FIG. 4B illustrates a second example scenario 420 in which the base station 402 and a UE 404 are both capable of full-duplex communication. FIG. 4C illustrates a third example scenario 430 in which the UE 404 is capable of full-duplex communication.

In the illustrated example of FIG. 4A, the base station 402 transmits a downlink transmission 410 to a first UE 406 while also receiving an uplink transmission 412 from a second UE 407. As shown in FIG. 4A, the first UE 406 and the second UE 407 are half-duplex (HD) UEs. For example, the first UE 406 and/or the second UE 407 may be capable of either receiving a transmission or transmitting a transmission at any point in time. In the illustrated example of FIG. 4B, the UE 404 receives a downlink transmission 422 from the base station 402 while also transmitting an uplink transmission 424 to the base station 402. Additionally, the base station 402 transmits the downlink transmission 422 to the UE 404 while also receiving the uplink transmission 424 from the UE 404. In the illustrated example of FIG. 4C, the UE 404 receives a downlink transmission 432 from a first transmit reception point (TRP) 408 while also transmitting an uplink transmission 434 to a second TRP 409.

In some examples, to employ full-duplex communication, antennas or antenna panels at the communication device may be split to facilitate receiving and transmitting at the same time. For example, the UE 404 may include a first antenna panel 440 (or a first subset of antennas of an antenna panel) to facilitate receiving transmissions and a second antenna panel 442 (or a second subset of antennas of the antenna panel) to facilitate transmitting transmissions, as shown in the example of FIG. 4C. In a similar manner, the base station 402 may include a first antenna panel 426 (or a first subset of antennas of an antenna panel) to facilitate receiving transmissions and a second antenna panel 428 (or a second subset of antennas of the antenna panel) to facilitate transmitting transmissions, as shown in the example of FIG. 4B.

However, due to the simultaneous reception and transmission of signals, a full-duplex capable communication device may incur self-interference. For example, the signals transmitted by the second antenna panel 442 of the UE 404 may propagate and interfere with the signal reception by the first antenna panel 440 of the UE 404. Such interference (e.g., self-interference or interference caused by other devices) may impact the quality of the communication, or even lead to a loss of information.

For example, in FIG. 4A, the base station 402 may experience self-interference at its receiving antenna when receiving the uplink signal from the first UE 406, the self-interference being due to reception of at least a part of the downlink signal transmitted to the second UE 407. The base station 402 may experience additional interference due to signals from another base station. Interference may also occur at the first UE 406 based on signals from the other base station as well as from uplink signals from the second UE 407. In FIG. 4B, the base station 402 and the UE 404 may each experience self-interference, due to a transmitted signal from the device leaking to (e.g., being received by) a receiver at the same device. In FIG. 4C, the first UE 406 may experience self-interference as a result of receiving at least a portion of the uplink transmission 434 when receiving the downlink transmission 432, e.g., the UE's uplink signal to the second TRP 409 may leak to (e.g., be received by) the UE's receiver when the UE is attempting to receive the signal from the first TRP 408. The first UE 406 may experience additional interference from other sources.

Figure 5C:
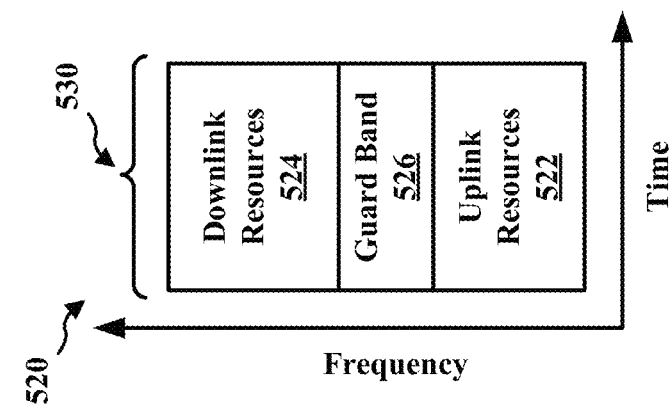
FIG. 5C depicts a timeline in which a full-duplex capable UE may employ SBFD, in accordance with various aspects of the present disclosure.
Figure 5B:
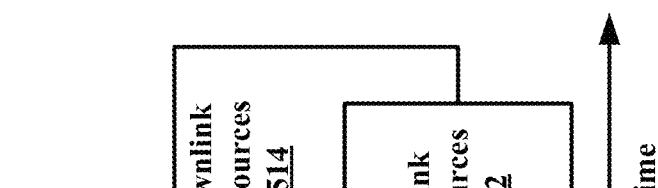
FIG. 5B depicts a timeline illustrating a partial overlap of a same in-band full-duplex resource, in accordance with various aspects of the present disclosure.
Figure 5A:
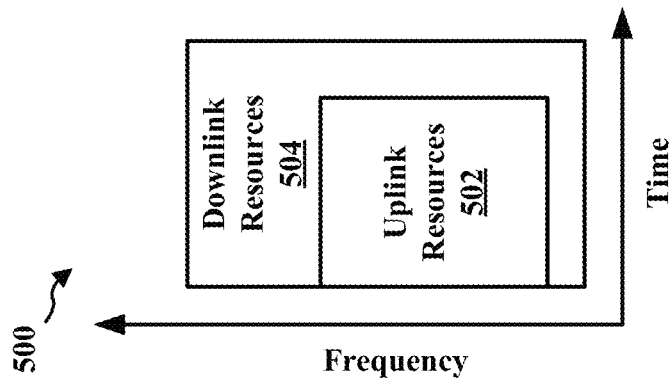
FIG. 5A depicts a timeline illustrating a full overlap of a same in-band full-duplex resource, in accordance with various aspects of the present disclosure.

A UE may implement full-duplex communication via in-band full-duplex (IBFD) or sub-band full-duplex (SBFD). When employing IBFD, the UE transmits and receives on a same time and frequency resource. That is, a downlink transmission and an uplink transmission share the same IBFD time/frequency resource. FIGS. 5A and 5B depict example timelines in which a full-duplex capable UE may employ IBFD communication. FIG. 5A depicts a timeline 500 illustrating a full overlap of a same IBFD resource. For example, uplink resources 502 (e.g., resources used by the UE for transmitting an uplink transmission) fully overlap with downlink resources 504 (e.g., resources used by the UE for receiving a downlink transmission). FIG. 5B depicts a timeline 510 illustrating a partial overlap of a same IBFD resource. For example, uplink resources 512 partially overlap with downlink resources 514.

When employing SBFD communication, the UE transmits and receives at the same time but using different frequency resources. FIG. 5C depicts an example timeline 520 in which a full-duplex capable UE may employ SBFD communication (sometimes referred to as "flexible duplex"). In some examples, uplink resources 522 and downlink resources 524 may be configured within a same time division duplex (TDD) band. As shown in FIG. 5C, the uplink resources 522 and the downlink resources 524 overlap in time, but do not overlap with respect to frequency resources. For example, the uplink resources 522 may be separated from the downlink resources 524 in the frequency domain by a guard band 526. Moreover, both of the uplink resources 522 and the downlink resources 524 of the SBFD example of FIG. 5C are within a same TDD band 530. In contrast, the uplink resources 502, 512 and/or the downlink resources 504, 514 of the IBFD examples of FIGS. 5A and 5B, respectively, may be configured across TDD bands.

As described above, when employing full-duplex communication, interference (or leakage) between signals may occur. Leakage may refer to a signal that is transmitted by the device and intended for reception at another device that is, at least partially, received as interference by the device's own receiver. For example, in FIG. 5C, the guard band 526 may be relatively small, such as 5 resource blocks (RBs) and, thus, leakage from the uplink resources 522 may spill through the guard band 526 to the downlink resources 524 and/or leakage from the downlink resources 524 may spill through the guard band 526 to the uplink resources 522. Thus, leakage may also refer to out-of-band emissions.

Figure 6:
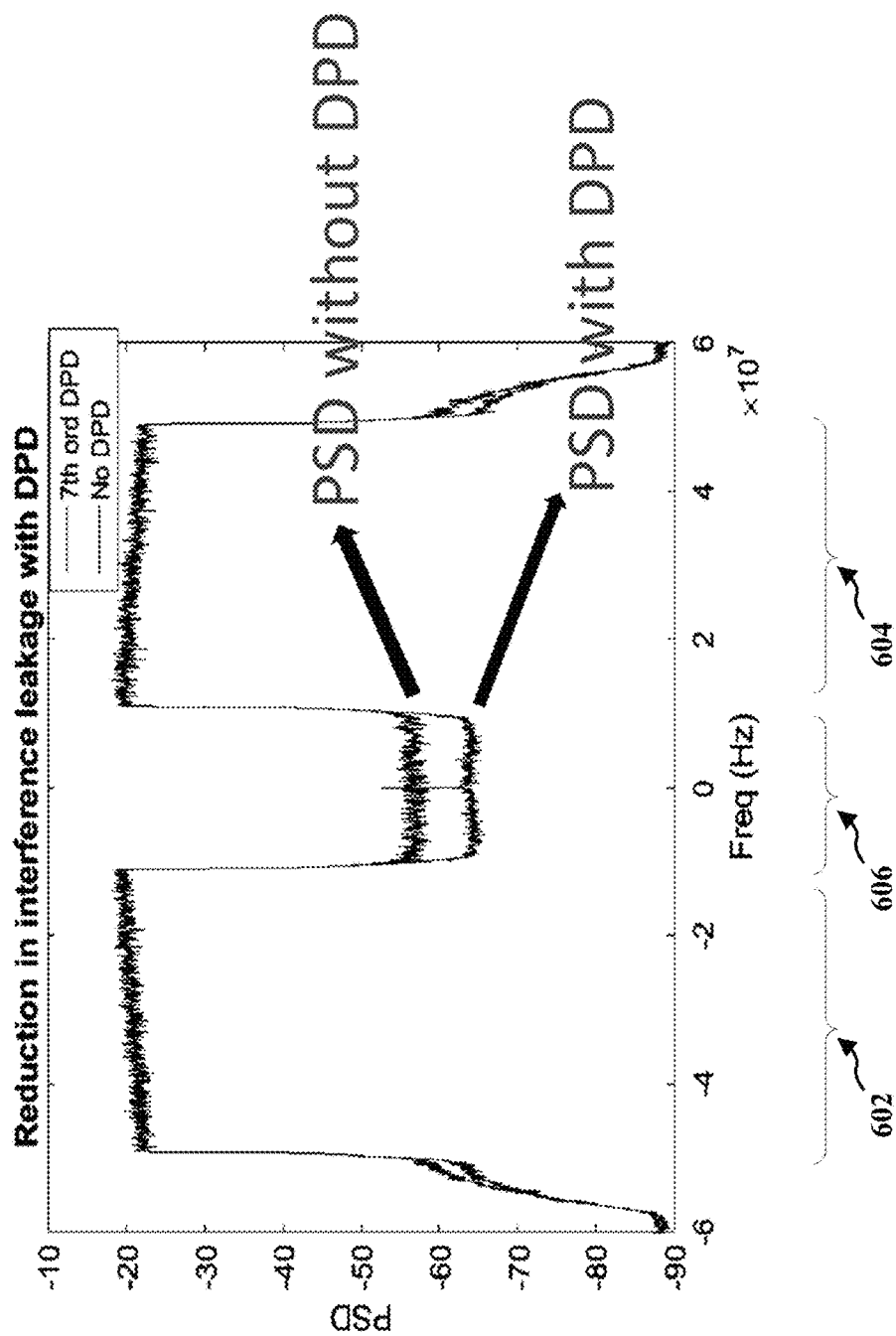
FIG. 6 illustrates an example diagram illustrating a power spectral density (PSD) of a node that is transmitting over a first resource block and a second resource block, in accordance with the teachings disclosed herein.

FIG. 6 illustrates an example diagram 600 illustrating a power spectral density (PSD) of a node that is transmitting over a first resource block 602 and a second resource block 604, as presented herein. Due to imperfections in the transmitter side, a middle portion 606 of the diagram illustrates a noise level. However, due to leakage, the PSD is higher than a noise level. Emission suppression techniques may attempt to reduce the leakage. For example, a UE may apply digital pre-distortion (DPD) to suppress the leakage. In the illustrated example of FIG. 6, applying DPD reduces leakage by about 10 decibels.

The leakage (or emission) across channels may be measured via an adjacent channel leakage ratio (ACLR). For example, ACLR may indicate the amount of leakage from the main band (e.g., in-band) to the side band (e.g., out-of-band). Better ACLR characteristics provide less interference in full-duplex communications. Different emission suppression techniques, such as DPD, may improve the ALCR, but as long as the UE satisfies an emission level, the UE may not apply such techniques. As used herein, the term "emission" refers to leakage between channels. Additionally, emissions may refer to in-band emissions and/or sub-band emissions.

Different full-duplex operations may be associated with different emission suppression levels. Additionally, the emission suppression levels may vary from one grant to another grant. For example, the emission suppression level may depend on whether there is an adjacent downlink transmission from the network (e.g., from the network to another UE). In other examples, the emissions suppression level may depend on a gap (e.g., a resource gap) between an uplink transmission and a downlink transmission.

While configuring the UE to satisfy aggressive emission suppression levels may reduce leakage in general scenarios, satisfying such emission suppression levels may be resource intensive at the UE with respective to power and/or energy. Aspects disclosed herein provide techniques for indicating emission suppression levels depending on a transmission scenario that enables the UE to conserve power resources. For example, techniques disclosed herein may dynamically indicate an emission suppression level that the UE is to satisfy for an uplink transmission. In some examples, the UE may receive the indication of the emission suppression level with a grant for an uplink transmission. For example, when the UE receives an uplink grant, downlink control information (DCI) scheduling the uplink grant may indicate the emission suppression level to be applied to the uplink grant.

Figure 7:
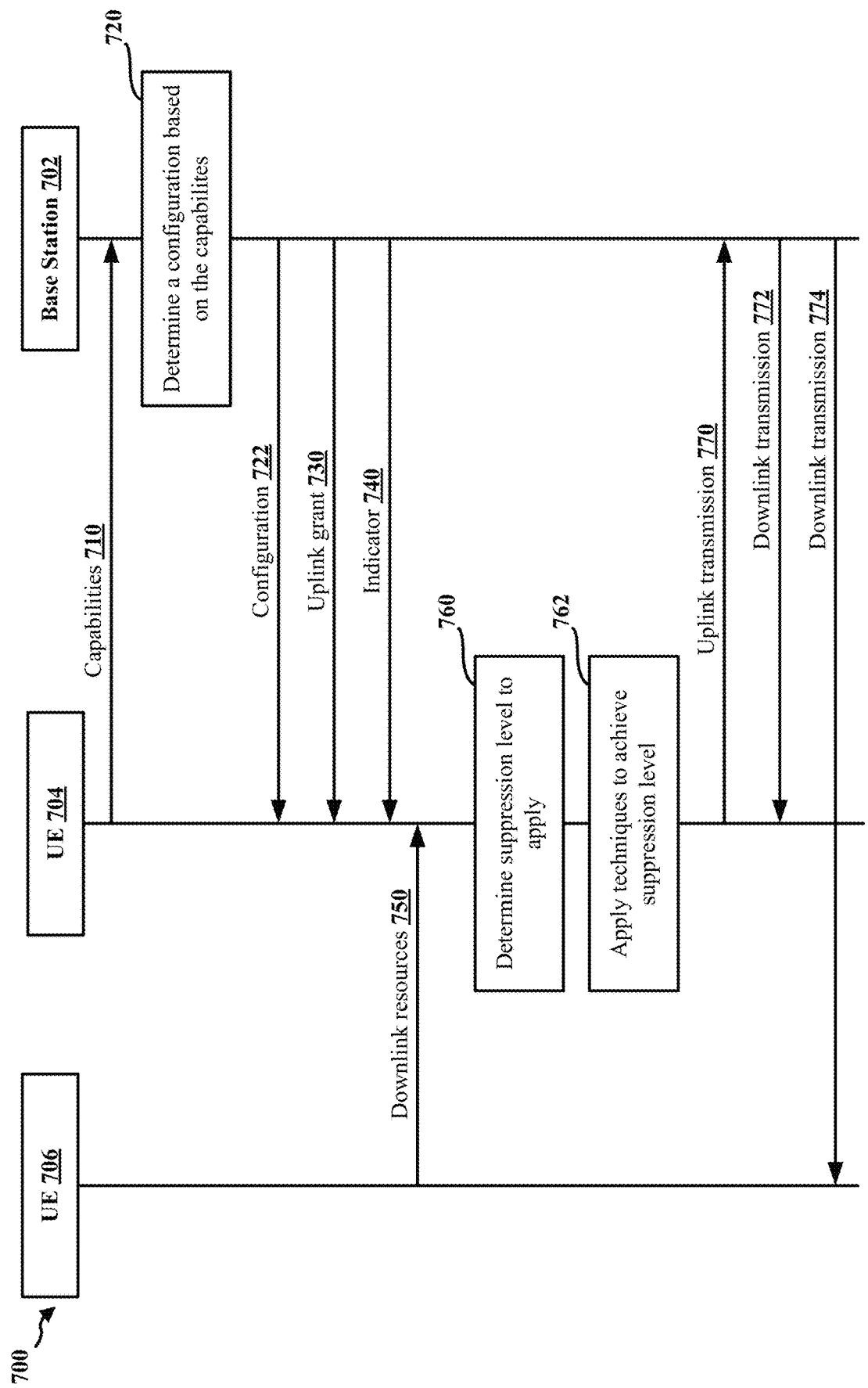
FIG. 7 is an example communication flow between a base station and a UE, in accordance with the teachings disclosed herein.

FIG. 7 illustrates an example communication flow 700 between a base station 702 and a UE 704, as presented herein. Aspects of the base station 702 may be implemented by the base station 102/180 of FIG. 1 and/or the base station 310 of FIG. 3. Aspects of the UE 704 may be implemented by the UE 104 of FIG. 1 and/or the UE 350 of FIG. 3. Although not shown in the illustrated example of FIG. 7, in additional or alternative examples, the base station 702 may be in communication with one or more other base stations or UEs, and/or the UE 704 may be in communication with one or more other base stations or UEs.

In the illustrated example of FIG. 7, the communication flow 700 facilitates the UE 704 applying an emission suppression level based on a transmission scenario that enables the UE 704 to converse resource, such as power resources and/or processing resources. To enable the UE 704 to receive an indication of an emission suppression level to apply to an uplink transmission, the UE 704 provides an indication of what levels of emission suppression the UE 704 is capable of performing. For example, the UE 704 transmits a capabilities message 710 that is received by the base station 702. The capabilities message 710 may include an indication of support for at least one emission suppression capability. In some examples, the at least one emission suppression capability may include at least one suppression amount supported by the UE 704. For example, using a first emission suppression technique, the UE 704 may be capable of 5 decibels suppression, using a second emission suppression technique, the UE 704 may be capable of 7 decibels suppression, and using a third emission suppression technique, the UE 704 may be capable of 10 decibels suppression. In such examples, the capabilities message 710 may indicate that the UE 704 supports 5 decibels suppression, 7 decibels suppression, and 10 decibels suppression. In some examples, the capabilities message 710 may indicate one or more emission suppression techniques supported by the UE 704, such as the first emission suppression technique, the second emission technique, and the third emission suppression technique.

At 720, the base station 702 determines a configuration based on the capabilities message 710. For example, the base station 702 may use the emission suppression levels supported by the UE 704 to assign downlink resources that are close to uplink resources for the UE 704. In some examples, a plurality of emission suppression levels supported by the UE may be referred to as a "group of multiple emission suppression levels." In some examples, the base station 702 may use more resources for a downlink transmission, thereby increasing throughput to the UE 704.

As shown in FIG. 7, the base station 702 transmits a configuration 722 that is received by the UE 704. The base station 702 may transmit the configuration 722 via RRC signaling. The configuration 722 may map an indicator to an emission suppression level supported by the UE 704. For example, FIG. 8A illustrates an example configuration 800 including a mapping between indicators 802 and respective emission suppression levels 804. As shown in FIG. 8A, a first indicator "01" maps to a 5 decibel (dB) emission suppression level, a second indicator "02" maps to a 7 dB emission suppression level, and a third indicator "03" maps to a 10 dB emission suppression level. The example configuration 800 also includes a skipped indicator 806 that maps to a default emission suppression level. In the illustrated example, the default emission suppression level is 2 dB.

In some examples, the configuration 722 may map resource gaps between a downlink transmission overlapping with an uplink transmission in a time-domain to emission suppression levels. For example, FIG. 8B illustrates an example configuration 850 including a mapping between resource gap indicators 852 and respective emission suppression levels 854. As shown in FIG. 8B, a first indicator indicating an "infinite gap" (e.g., a transmission scenario in which no downlink transmission is overlapping with an uplink transmission) maps to a 5 dB emission suppression level, a second indicator indicating "40 RBs" maps to a 7 dB emission suppression level, and a third indicator indicating "20 RBs" maps to a 10 dB emission suppression level. Although the example of FIG. 8B measures the resources gaps in terms of resource blocks (RBs), in other examples, the resource gaps may be indicated in resource elements (REs). The example configuration 850 also includes a skipped indicator 856 that maps to a default emission suppression level. In the illustrated example, the default emission suppression level is 2 dB.

Returning to the example of FIG. 7, the base station 702 transmits an uplink grant 730 that is received by the UE 704. The uplink grant 730 may schedule an uplink transmission from the UE 704 to the base station 702. The base station 702 also transmits an indicator 740 that is received by the UE 704. The indicator 740 may indicate an emission suppression level associated with the uplink transmission. For example, the indicator 740 may include an indicator, such as the example indicators 802 of FIG. 8A (e.g., an "01," an "02," an "03," etc.). In some example, the indicator 740 may include a resource gap, such as the example resource gap indicators 852 of FIG. 8B (e.g., an "infinite gap," a "40 RBs" gap, a "20 RBs" gap, etc.).

In some examples, the uplink grant 730 may include the indicator 740. For example, the uplink grant 730 and the indicator 740 may be included in a same transmission. In some such examples, the uplink grant 730 may include one or more bits associated with the indicator 740.

At 760, the UE 704 may determine an emission suppression level to apply to an uplink transmission. For example, the UE 704 may use the configuration 722 to map the indicator 740 to an emission suppression level. Otherwise described, the UE 704 may map the indicator 740 to an emission suppression level based on the configuration 722. In some examples, the configuration 722 may configure a default emission suppression level that the UE 704 is to apply when the indicator 740 is a skipped indicator. As used herein, the term "skipped indicator" corresponds to an indicator that does not map to an emission suppression level based on the configuration 722. For example, and referring to the example configuration 800 of FIG. 8A, when the indicator 740 is not an indicator included in the indicators 802, the UE 704 is configured to apply a default emission suppression level (e.g., a 2 dB emission suppression level). In a similar manner, referring to the example configuration 850 of FIG. 8B, when the indicator 740 is not an indicator included in the indicators 852, the UE 704 is configured to apply the default emission suppression level (e.g., a 2 dB emission suppression level).

In some examples, the UE 704 may identify a skipped indicator based on excluded information. For example, the UE 704 may be configured to receive the indicator 740 associated with each uplink grant 730. In such examples, when the UE 704 receives the uplink grant 730 and does not receive an associated indicator, the UE 704 may determine that there is a skipped indicator. In such examples, the UE 704 may determine, at 740, to apply the default emission suppression level.

At 762, the UE 704 applies techniques to achieve the indicated emission suppression level. For example, the UE 704 may apply DPD to achieve the emission suppression level indicated by the indicator 740.

As shown in FIG. 7, the UE 704 transmits an uplink transmission 770 that is received by the base station 702. The UE 704 may transmit the uplink transmission 770 based on the emission suppression level indicated by the indicator 740. The UE 704 may also receive a downlink transmission 772 from the base station 702. The uplink transmission 770 and the downlink transmission 772 may overlap in the time-domain.

In some examples, the indicator 740 may indicate an emission suppression level based on the uplink transmission 770 scheduled by the uplink grant 730 and the downlink transmission 772 to the UE 704. In some examples, the indicator 740 may indicate an emission suppression level based on the uplink transmission 770 scheduled by the uplink grant 730 and any downlink transmissions by the base station 702. For example, the base station 702 may transmit a second downlink transmission 774 to a second UE 706 and the second downlink transmission 774 may overlap in the time-domain with the uplink transmission 770.

Figure 9:
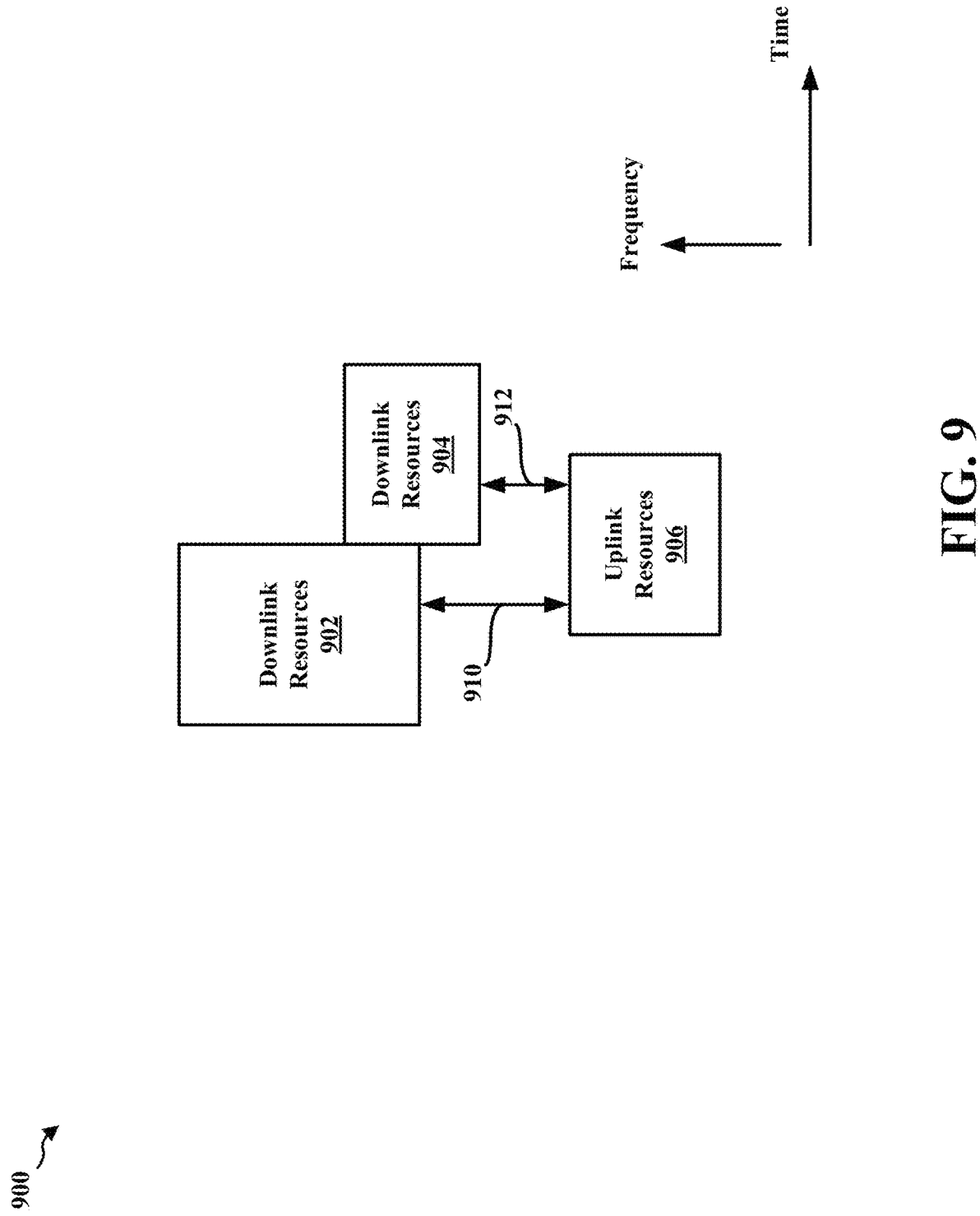
FIG. 9 illustrates an example diagram including first downlink resources, second downlink resources, and uplink resources, in accordance with the teachings disclosed herein.

In some examples, the base station 702 may transmit the downlink transmission 772 to the UE 704 and may also transmit the second downlink transmission 774 to the second UE 706. In some examples, the downlink transmission 772 and the second downlink transmission 774 may overlap in the time-domain with the uplink transmission 770. For example, FIG. 9 illustrates an example diagram 900 including first downlink resources 902, second downlink resources 904, and uplink resources 906, as presented herein. The first downlink resources 902 may be associated with the downlink transmission 772 of FIG. 7, the second downlink resources 904 may be associated with the second downlink transmission 774, and the uplink resources 906 may be associated with the uplink transmission 770. As shown in FIG. 9, a first resources gap 910 may be associated with the first downlink resources 902 and the uplink resources 906, and a second resources gap 912 may be associated with the second downlink resources 904 and the uplink resources 906. In such examples in which two or more downlink resources may overlap in the time-domain with uplink resources, the indicator 740 may indicate an emission suppression level based on the minimum gap between the uplink resources and the downlink resources. For example, the first resources gap 910 may be associated with a first emission suppression level (e.g., 5 dB) and the second resources gap 912 may be associated with a second emission suppression level (e.g., 10 dB). In such examples, the indicator 740 may indicate the second emission suppression level (e.g., 10 dB) as the second resources gap 912 is smaller than the first resources gap 910.

Referring again to FIG. 7, in some examples, a nearby UE may share their own downlink reception resources with the UE 704. For example, the second UE 706 may transmit downlink resources 750 that are received by the UE 704. The second UE 706 may transmit the downlink resources 750 via sidelink to the UE 704. The downlink resources 750 may indicate one or more downlink reception resources associated with the second downlink transmission 774 from the base station 702 to the second UE 706. In such examples, the UE 704 may have the capability to determine (e.g., at 760) an emission suppression level to apply for the uplink transmission 770 based on the downlink resources 750. For example, the UE 704 may determine a resource gap between the uplink transmission 770 and the second downlink transmission 774 and use the resource gap and the configuration 722 to determine the emission suppression level.

In some examples, the uplink grant 730 may correspond to a configured grant. For example, the uplink grant 730 may configure the UE 704 with one or more uplink transmission occasions. In such examples, if the UE 704 does not have anything to transmit, the UE 704 may skip the uplink transmission occasion. However, when the UE 704 is configured with the multiples instances for uplink transmissions, the UE may be unaware of whether the network (e.g., the base station 702) is transmitting a downlink transmission that overlaps in the time-domain with a respect uplink transmission occasion.

Figure 10:
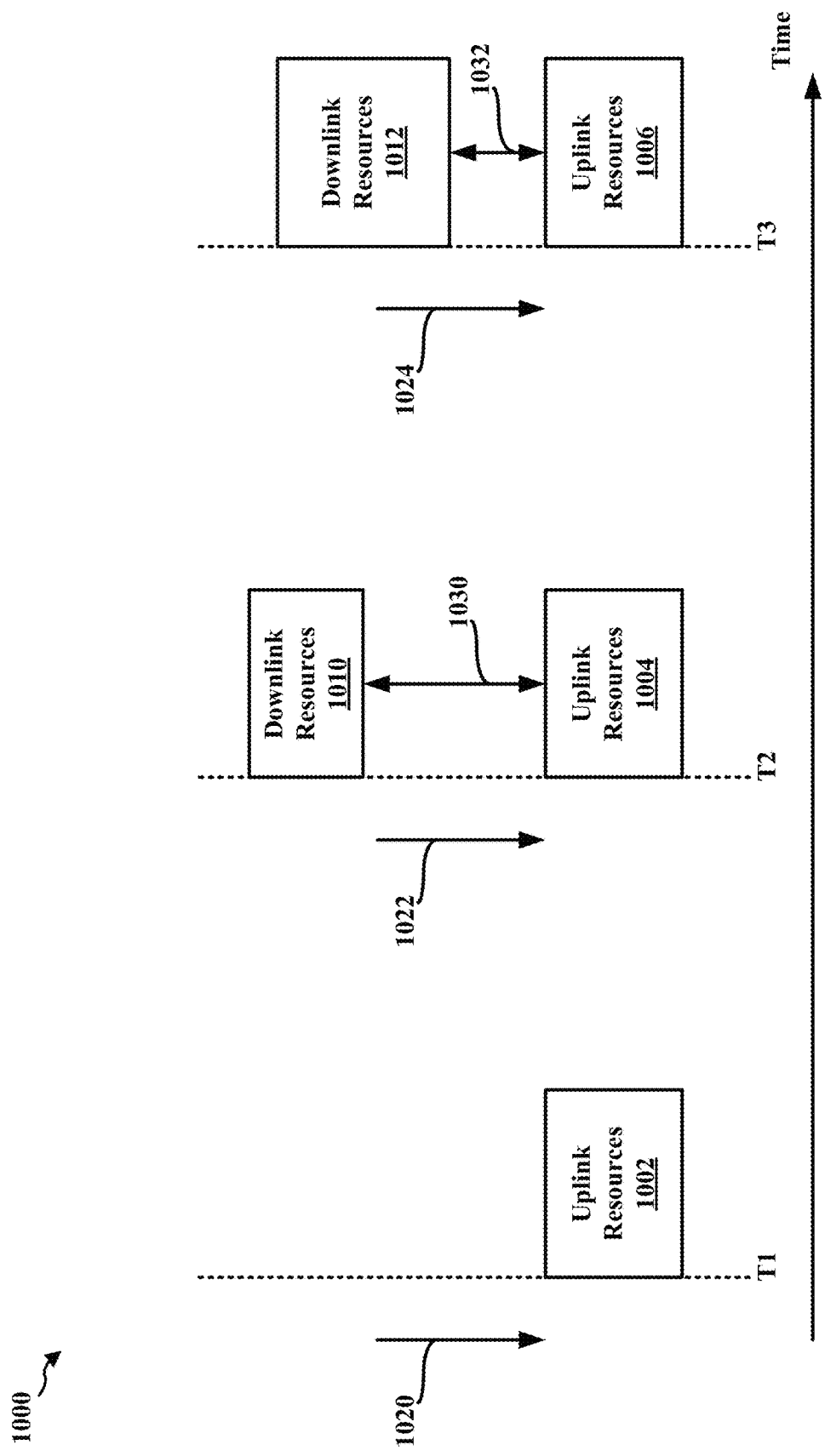
FIG. 10 illustrates an example timing diagram including three example uplink transmission occasions configured for a UE, in accordance with the teachings disclosed herein.

FIG. 10 illustrates an example timing diagram 1000 including three example uplink transmission occasions configured for a UE, as presented herein. For example, the UE (e.g., the UE 704 of FIG. 7) may be configured with first uplink resources 1002 associated with a first uplink transmission occasion at a time T1, may be configured with second uplink resources 1004 associated with a second uplink transmission occasion at a time T2, and may be configured with third uplink resources 1006 associated with a third uplink transmission occasion at a time T3. As shown in FIG. 10, there is no downlink transmission overlapping in the time-domain with the first uplink transmission occasion at the time T1, and there are downlink transmissions overlapping in the time-domain with the second uplink transmission at the time T2 and the time T3. For example, there are first downlink resources 1010 associated with a first downlink transmission at the time T2 and second downlink resources 1012 associated with a second downlink transmission at the time T3. The first downlink resources 1010 and the second downlink resources 1012 may be associated with downlink transmissions to the UE and/or to a nearby UE (e.g., the example second UE 706 of FIG. 7).

In some examples, to enable the UE to apply an emission suppression level to an uplink transmission that conserves resources (e.g., power resources and/or processing resources) at the UE, the UE may receive an indicator before each uplink transmission occasion in the time-domain. For example, the UE may receive a first indicator 1020 before the first uplink transmission occasion at the time T1. The first indicator 1020 may indicate an emission suppression level to apply when transmitting an uplink transmission at the first uplink transmission occasion. For example, as shown in FIG. 10, there is no downlink transmission overlapping in the time-domain with the first uplink resources 1002 at the time T 1. In such examples, the first indicator 1020 may indicate to the UE to apply a first emission suppression level that is relatively lenient. For example, and referring to the example configuration 800 of FIG. 8A, the first indicator 1020 may indicate to the UE to apply a 5 dB emission suppression level. In other examples, the first indicator 1020 may indicate a resources gap (e.g., "infinite") and the UE may use the configuration 850 of FIG. 8B to determine to apply a 5 dB emission suppression level. Otherwise described, the UE may determine to apply a 5 dB emission suppression level based on the configuration 850.

As shown in FIG. 10, the UE may receive a second indicator 1022 before the second uplink transmission occasion at the time T2, and may receive a third indicator 1024 before the third uplink transmission occasion at the time T3 in the time-domain. In some examples, the second indicator 1022 and/or the third indicator 1024 may indicate an emission suppression level to apply based on the first downlink resources 1010 and the second downlink resources 1012, respectively. For example, and referring to the example configuration 800 of FIG. 8A, the second indicator 1022 may indicate to apply the second emission suppression level (e.g., 7 dB) and the third indicator 1024 may indicate to apply the third emission suppression level (e.g., 10 dB). As shown in FIG. 10, a first resources gap 1030 between the second uplink resources 1004 and the first downlink resources 1010 is larger than a second resources gap 1032 between the third uplink resources 1006 and the second downlink resources 1012. Thus, the base station may indicate to apply a stricter (or more aggressive) emission suppression level in association with the third uplink transmission occasion at the time T3 (e.g., 10 dB) than at the second uplink transmission occasion at the time T2 (e.g., 7 dB).

In some examples, the second indicator 1022 and/or the third indicator 1024 may indicate the resources gap between the uplink resources and the downlink resources at the respective uplink transmission occasions. For example, the second indicator 1022 may indicate that the first resources gap 1030 corresponds to 40 RBs. In such examples, and referring to the example configuration 850 of FIG. 8B, the UE may map the value of the first resources gap 1030 to the second emission suppression level (e.g., 7 dB). The third indicator 1024 may indicate that the second resources gap 1032 corresponds to a resources gap of 20 RBs. In such examples, and referring to the example of FIG. 8B, the UE may use the configuration 850 and map the value of the second resources gap 1032 to the third emission suppression level (e.g., 10 dB). Otherwise described, the UE may map the value of the second resources gap 1032 to the third emission suppression level based on the configuration 850.

As described above, in some examples, the base station may skip an indicator (e.g., a skipped indicator). In such examples, the UE may apply a default emission suppression level. For example, and with respect to the first indicator 1020, the base station may skip transmitting the first indicator 1020. In such examples, the UE may use a default emission suppression level configured via a configuration to determine what emission suppression level to apply. For example, the UE may apply a 2 dB emission suppression level when the first indicator 1020 is a skipped indicator.

In some examples, the first indicator 1020, the second indicator 1022, and/or the third indicator 1024 may include DCI. In some examples, the first indicator 1020, the second indicator 1022, and/or the third indicator 1024 may be transmitted with DCI activating the respective uplink transmission occasion. In some examples, the first indicator 1020, the second indicator 1022, and/or the third indicator 1024 may be DCI transmitted in a separate transmission than the DCI activating the respective uplink transmission occasion.

Figure 11:
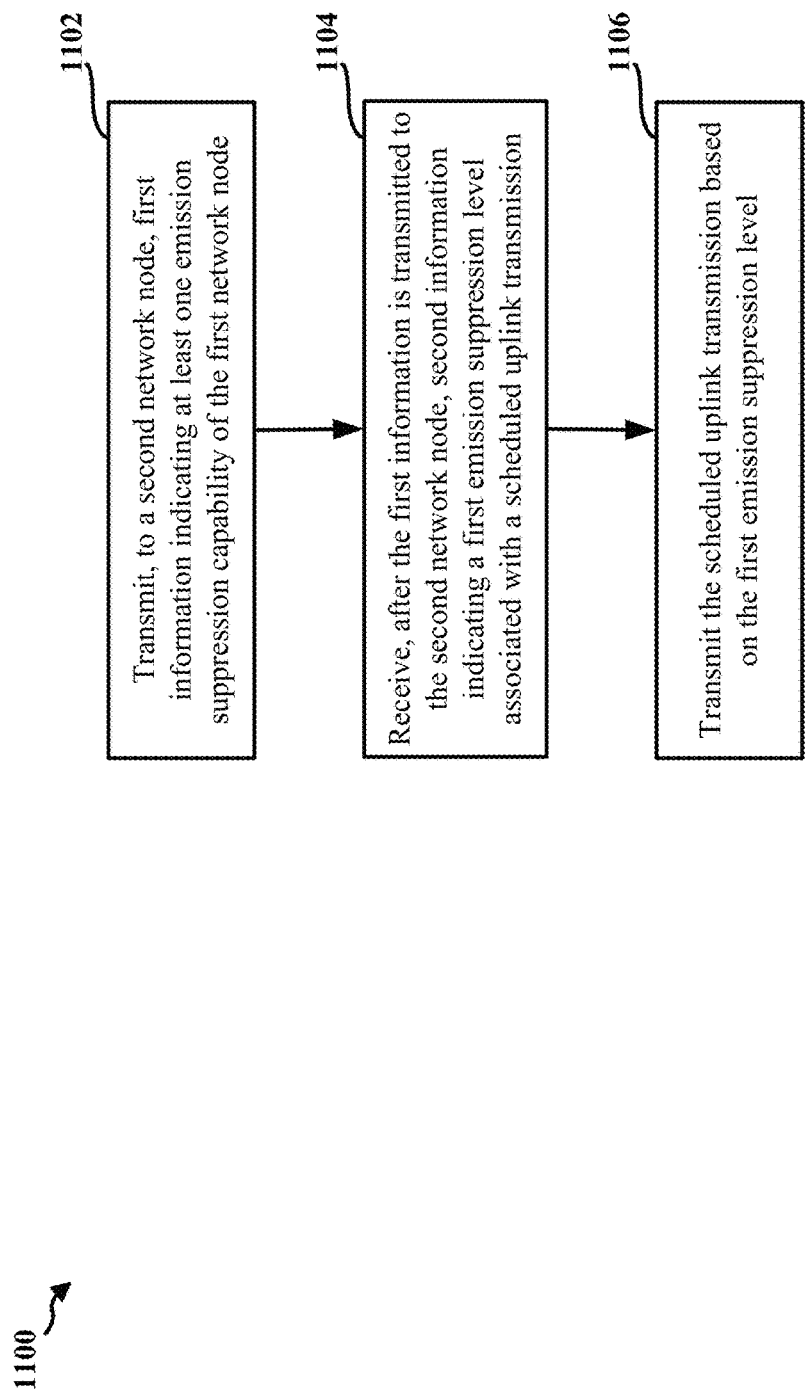
FIG. 11 is a flowchart of a method of wireless communication at a UE, in accordance with the teachings disclosed herein.

FIG. 11 is a flowchart 1100 of a method of wireless communication. The method may be performed by a first network node (e.g., the UE 104, the UE 350, and/or an apparatus 1302 of FIG. 13). The method may facilitate conserving processing resources and/or power resources by enabling a first network node to apply an emission suppression level for an uplink transmission based on an uplink grant associated with the uplink transmission.

At 1102, the first network node transmits, to a second network node, first information indicating at least one emission suppression capability of the first network node, as described in connection with the capabilities message 710 of FIG. 7. In some examples, the first information may include at least one suppression amount supported by the first network node. The transmitting of the first information, at 1102, may be performed by a capability component 1340 of the apparatus 1302 of FIG. 13.

At 1104, the first network node receives, after the first information is transmitted to the second network node, second information indicating a first emission suppression level associated with a scheduled uplink transmission, as described in connection with the indicator 740 of FIG. 7. The receiving of the second information indicating the first emission suppression level, at 1104, may be performed by an indicator component 1344 of the apparatus 1302 of FIG. 13.

At 1106, the first network node transmits the scheduled uplink transmission based on the first emission suppression level, as described in connection with the uplink transmission 770 of FIG. 7. The transmitting of the scheduled uplink transmission, at 1106, may be performed by a suppression component 1346 of the apparatus 1302 of FIG. 13.

Figure 12:
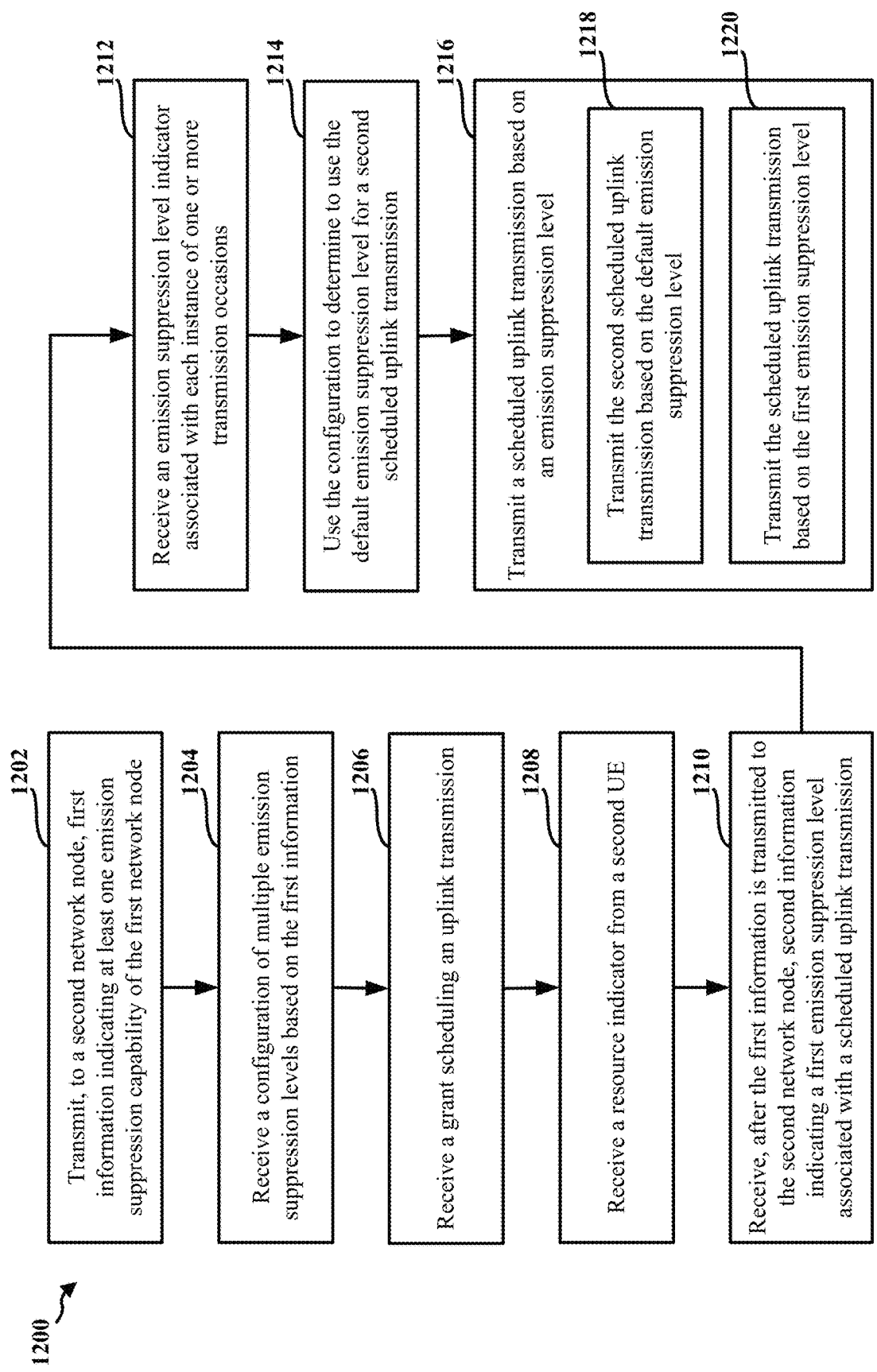
FIG. 12 is a flowchart of a method of wireless communication at a UE, in accordance with the teachings disclosed herein.

FIG. 12 is a flowchart 1200 of a method of wireless communication. The method may be performed by a first network node (e.g., the UE 104, the UE 350, and/or an apparatus 1302 of FIG. 13). The method may facilitate conserving processing resources and/or power resources by enabling a first network node to apply an emission suppression level for an uplink transmission based on an uplink grant associated with the uplink transmission.

At 1202, the first network node transmits, to a second network node, first information indicating at least one emission suppression capability of the first network node, as described in connection with the capabilities message 710 of FIG. 7. In some examples, the first information may include at least one suppression amount supported by the first network node. The transmitting of the first information, at 1202, may be performed by a capability component 1340 of the apparatus 1302 of FIG. 13.

At 1206, the first network node may receive a grant scheduling the uplink transmission, as described in connection with the uplink grant 730 of FIG. 7. The receiving of the grant, at 1206, may be performed by a grant component 1342 of the apparatus 1302 of FIG. 13.

At 1210, the first network node receives, after the first information is transmitted to the second network node, second information indicating a first emission suppression level associated with a scheduled uplink transmission, as described in connection with the indicator 740 of FIG. 7. The receiving of the second information indicating the first emission suppression level, at 1210, may be performed by an indicator component 1344 of the apparatus 1302 of FIG. 13. In some examples, the first network node may receive the grant (e.g., at 1206) and the second information (e.g., at 1210) in a same transmission.

At 1216, the first network node transmits a scheduled uplink transmission based on an emission suppression level. For example, at 1220, the first network node transmits the scheduled uplink transmission based on the first emission suppression level, as described in connection with the uplink transmission 770 of FIG. 7. The transmitting of the scheduled uplink transmission, at 1220, may be performed by a suppression component 1346 of the apparatus 1302 of FIG. 13.

At 1204, the first network node may receive a configuration of multiple emission suppression levels based on the first information, as described in connection with the configuration 722 of FIG. 7, the configuration 800 of FIG. 8A, and/or the configuration 850 of FIG. 8B. The multiple emission suppression levels may include the first emission suppression level. In some examples, the multiple emission suppression levels may include a default emission suppression level. In some examples, a skipped indicator or excluded information may map to the default emission suppression level. The receiving of the configuration, at 1204, may be performed by a configuration component 1348 of the apparatus 1302 of FIG. 13.

In some examples, the first network node may receive the configuration via RRC signaling. In some examples, the configuration may indicate a relationship between the second information and the first emission suppression level of the multiple emission suppression levels, as described in connection with the example configuration 800 of FIG. 8A and/or the configuration 850 of FIG. 8B. In some examples, the second information (e.g., at 1210) may indicate a resource gap between a downlink transmission overlapping with the scheduled uplink transmission in a time-domain, as described in connection with the example configuration 850 and the resource gap indicators 852 of FIG. 8B. For example, the configuration may indicate a relationship between the resource gap of the second information to the first emission suppression level of the multiple emission suppression levels. In some examples, the resource gap may correspond to a minimum gap between one or more downlink transmissions overlapping with the scheduled uplink transmission in the time-domain, as described in connection with the example first resources gap 910 and the example second resources gap 912 of FIG. 9.

In some examples, the downlink transmission overlapping with the uplink transmission may be from the second network node to the first network node, as described in connection with the downlink transmission 772 of FIG. 7.

In some examples, the downlink transmission overlapping with the uplink transmission may be from the second network node to a third network node, as described in connection with the second downlink transmission 774 of FIG. 7. In some such examples, at 1208, the first network node may receive resource information from the third network node, the resource information indicating one or more downlink reception resources associated with the downlink transmission to the third network node, as described in connection with the downlink resources 750 of FIG. 7. The receiving of the resource indicator from the third network node, at 1208, may be performed by a resources component 1350 of the apparatus 1302 of FIG. 13.

In some examples, the second information (e.g., at 1210) may exclude information indicative of an emission suppression level. For example, the second information may be a skipped indicator. In some examples, the second information may include an indicator not included in the configuration (e.g., at 1204). For example, the second information may include an indicator not included in the indicators 802 of FIG. 8A and/or the indicators 852 of FIG. 8B. At 1214, the first network node may use the configuration to determine to use the default emission suppression level of the multiple emission suppression levels for a second scheduled uplink transmission, as described in connection with 760 of FIG. 7. The using of the configuration to determine to use the default emission suppression level, at 1214, may be performed by a mapping component 1352 of the apparatus 1302 of FIG. 13.

At 1218, the first network node may transmit the second scheduled uplink transmission based on the default emission suppression level, as described in connection with the uplink transmission 770 of FIG. 7. The transmitting of the second scheduled uplink transmission, at 1218, may be performed by the suppression component 1346 of the apparatus 1302 of FIG. 13.

In some examples, the grant scheduling the uplink grant (e.g., at 1206) may include a configured grant configuring one or more transmission occasions, the one or more transmission occasions including at least the scheduled uplink transmission, as described in connection with the example of FIG. 10. In some examples, at 1212, the first network node may receive respective emission suppression level information associated with each respective occasion of the one or more transmission occasions, as described in connection with the first indicator 1020, the second indicator 1022, and/or the third indicator 1024 of FIG. 10. The receiving of the respective emission suppression level information, at 1212, may be performed by the indicator component 1344 of the apparatus 1302 of FIG. 13.

In some examples, the first network node may receive each respective emission suppression level information (e.g., the first indicator 1020, the second indicator 1022, and/or the third indicator 1024) and a configured grant activator in a same transmission. In some examples, the first network node may receive each respective emission suppression level information (e.g., the first indicator 1020, the second indicator 1022, and/or the third indicator 1024) before a respective instance of the one or more transmission occasions in a time-domain.

Figure 13:
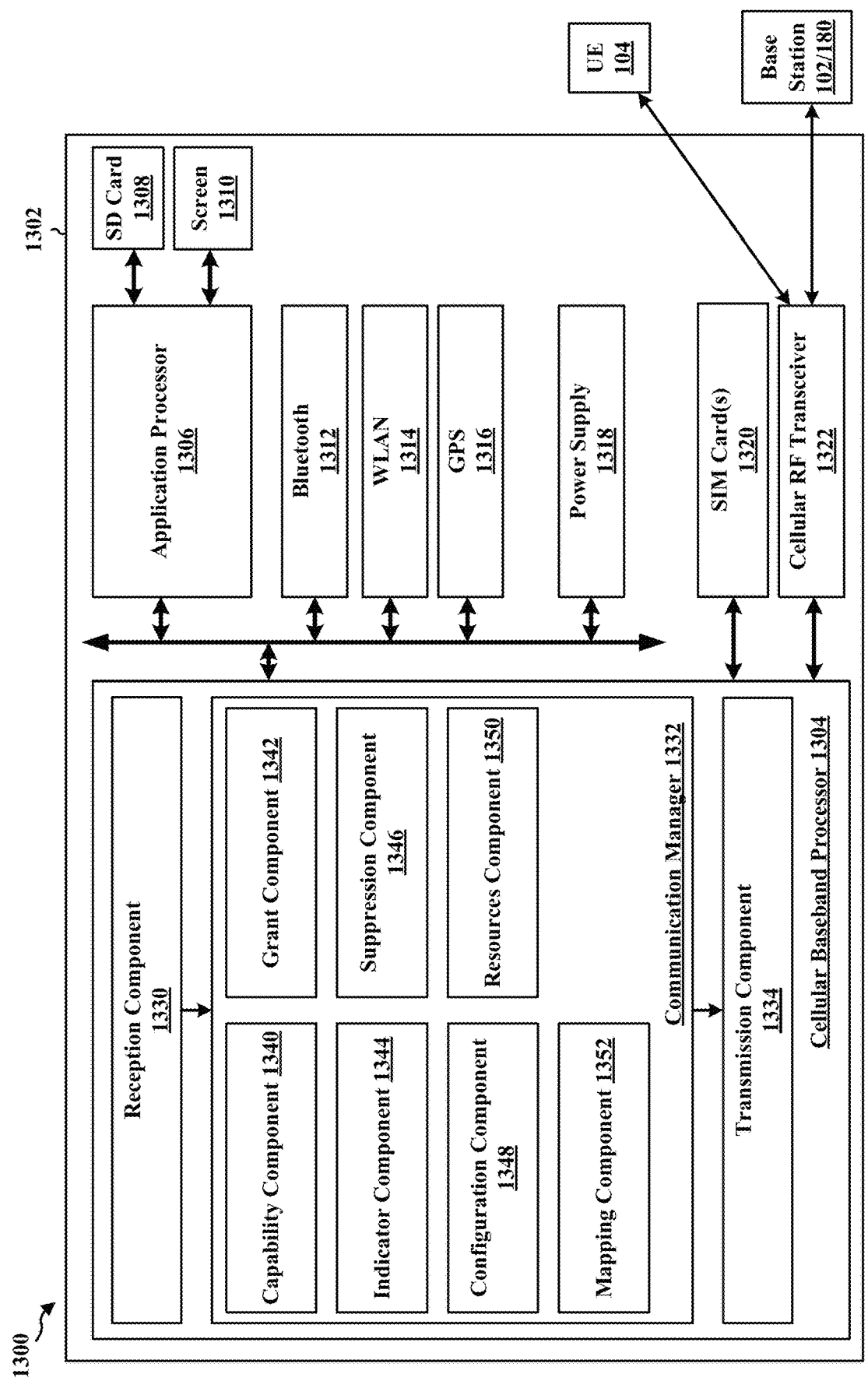
FIG. 13 is a diagram illustrating an example of a hardware implementation for an example apparatus, in accordance with the teachings disclosed herein.

FIG. 13 is a diagram 1300 illustrating an example of a hardware implementation for an apparatus 1302. The apparatus 1302 may be a first network node, a component of a first network node, or may implement first network node functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or base station 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the cellular baseband processor 1304, and in another configuration, the apparatus 1302 may be the entire UE (e.g., see the UE 350 of FIG. 3) and include the additional modules of the apparatus 1302.

The communication manager 1332 includes a capability component 1340 that is configured to transmit, to a second network node, first information indicating at least one emission suppression capability of the first network node, for example, as described in connection with 1102 of FIGS. 11 and/or 1202 of FIG. 12.

The communication manager 1332 also includes a grant component 1342 that is configured to receive a grant scheduling an uplink transmission, for example, as described in connection with 1206 of FIG. 12.

The communication manager 1332 also includes an indicator component 1344 that is configured to receive, after the first information is transmitted to the second network node, second information indicating a first emission suppression level associated with a scheduled uplink transmission, for example, as described in connection with 1104 of FIGS. 11 and/or 1210 of FIG. 12. The example indicator component 1344 may also be configured to receive an emission suppression level indicator associated with each instance of one or more transmission occasions, as described in connection with 1212 of FIG. 12.

The communication manager 1332 also includes a suppression component 1346 that is configured to transmit the scheduled uplink transmission based on the first emission suppression level, for example, as described in connection with 1106 of FIGS. 11 and/or 1220 of FIG. 12. The example suppression component 1346 may also be configured to transmit the second scheduled uplink transmission based on the default emission suppression level, for example, as described in connection with 1218 of FIG. 12. The example suppression component 1346 may also be configured to transmit a scheduled uplink transmission based on an emission suppression level, for example, as described in connection with 1216 of FIG. 12.

The communication manager 1332 also includes a configuration component 1348 that is configured to receive a configuration of multiple emission suppression levels based on the first information, where the multiple emission suppression levels include the first emission suppression level, for example, as described in connection with 1204 of FIG. 12.

The communication manager 1332 also includes a resources component 1350 that is configured to receive resource information from the third network node, the resource information indicating one or more downlink reception resources associated with the downlink transmission to the third network node, for example, as described in connection with 1208 of FIG. 12.

The communication manager 1332 also includes a mapping component 1352 that is configured to use the configuration to determine to use the default emission suppression level for a second scheduled uplink transmission, for example, as described in connection with 1214 of FIG. 12.

The apparatus may include additional components that perform each of the blocks of the algorithm in the flowcharts of FIG. 11 and/or FIG. 12. As such, each block in the flowcharts of FIG. 11 and/or FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for transmitting, to a second network node, first information indicating at least one emission suppression capability of the first network node. The example apparatus 1302 also includes means for receiving, after the first information is transmitted to the second network node, second information indicating a first emission suppression level associated with a scheduled uplink transmission. The example apparatus 1302 also includes means for transmitting the scheduled uplink transmission based on the first emission suppression level.

In another configuration, the example apparatus 1302 also includes means for receiving a configuration of multiple emission suppression levels based on the first information, where the multiple emission suppression levels include the first emission suppression level.

In another configuration, the example apparatus 1302 also includes means for receiving the configuration via RRC signaling.

In another configuration, the example apparatus 1302 also includes means for receiving resource information from a third network node, the resource information indicating one or more downlink reception resources associated with the downlink transmission to the third network node.

In another configuration, the example apparatus 1302 also includes means for receiving a configuration of multiple emission suppression levels based on the first information, where the multiple emission suppression levels include a default emission suppression level. The example apparatus 1302 also includes means for transmitting a second scheduled uplink transmission based on the default emission suppression level.

In another configuration, the example apparatus 1302 also includes means for using the configuration to determine to use the default emission suppression level for a second scheduled uplink transmission.

In another configuration, the example apparatus 1302 also includes means for receiving a grant scheduling the scheduled uplink transmission and the second information in a same transmission.

In another configuration, the example apparatus 1302 also includes means for receiving a grant scheduling the scheduled uplink transmission, the grant including a configured grant configuring one or more transmission occasions, the one or more transmission occasions including at least the scheduled uplink transmission.

In another configuration, the example apparatus 1302 also includes means for receiving respective emission suppression level information associated with each respective occasion of the one or more transmission occasions.

In another configuration, the example apparatus 1302 also includes means for receiving respective emission suppression level information before each respective occasion of the one or more transmission occasions in a time-domain.

The means may be one or more of the components of the apparatus 1302 configured to perform the functions recited by the means. As described supra, the apparatus 1302 may include the TX processor 368, the RX processor 356, and the controller/processor 359. As such, in one configuration, the means may be the TX processor 368, the RX processor 356, and the controller/processor 359 configured to perform the functions recited by the means.

Figure 14:
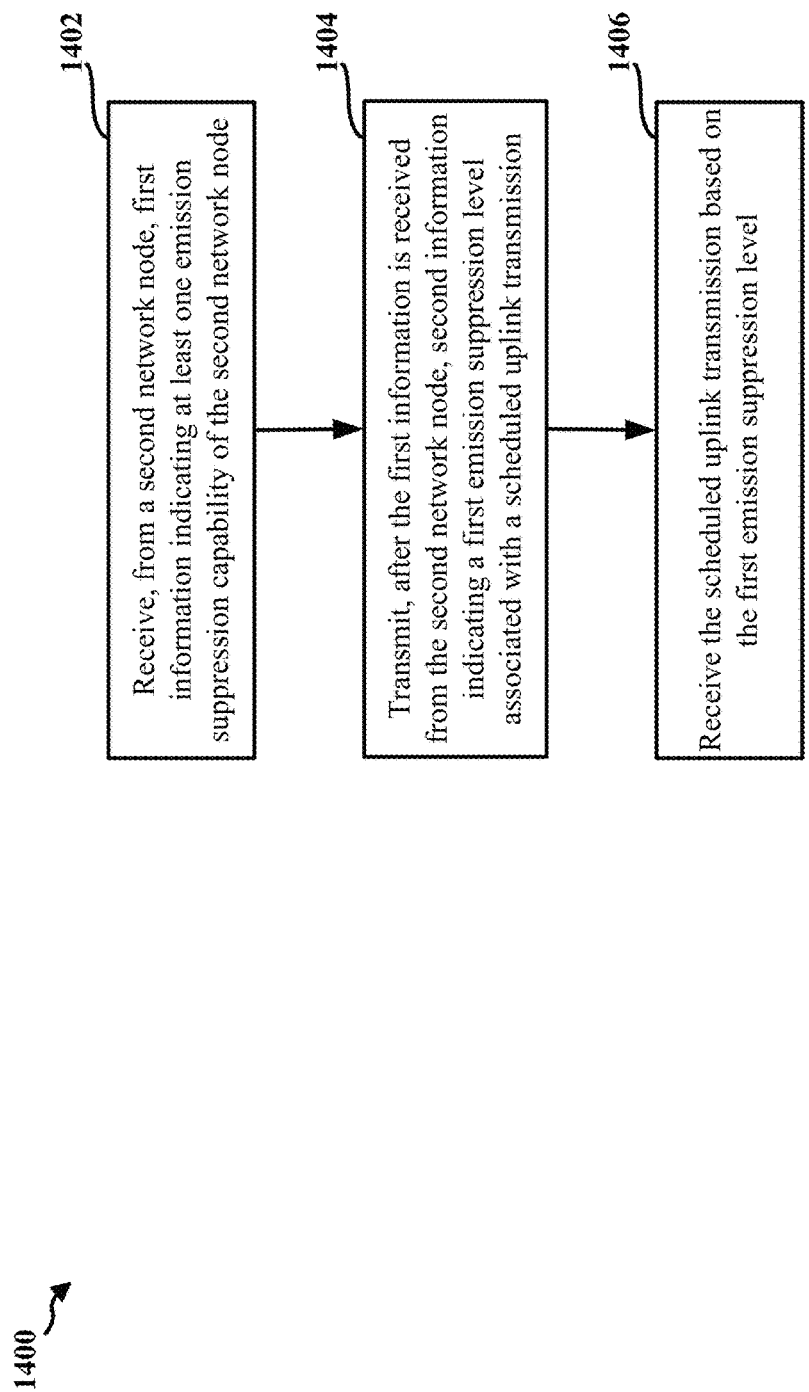
FIG. 14 is a flowchart of a method of wireless communication at a base station, in accordance with the teachings disclosed herein.

FIG. 14 is a flowchart 1400 of a method of wireless communication. The method may be performed by a first network node (e.g., the base station 102/180, the base station 310, and/or an apparatus 1602 of FIG. 16). The method may facilitate conserving processing resources and/or power resources by enabling a second network node to apply an emission suppression level for an uplink transmission based on an uplink grant associated with the uplink transmission.

At 1402, the first network node receives, from a second network node, first information indicating at least one emission suppression capability of the second network node, as described in connection with the capabilities message 710 of FIG. 7. In some examples, the first information includes at least one suppression amount supported by the second network node. The receiving of the first information, at 1402, may be performed by a capability component 1640 of the apparatus 1602 of FIG. 16.

At 1404, the first network node transmits, after the first information is received from the second network node, second information indicating a first emission suppression level associated with a scheduled uplink transmission, as described in connection with the indicator 740 of FIG. 7. In some examples, the second information may exclude information indicative of an emission suppression level. The transmitting of the second information, at 1404, may be performed by an indicator component 1644 of the apparatus 1602 of FIG. 16.

At 1406, the first network node receives the scheduled uplink transmission based on the first emission suppression level, as described in connection with the uplink transmission 770 of FIG. 7. The receiving of the scheduled uplink transmission, at 1406, may be performed by an uplink component 1646 of the apparatus 1602 of FIG. 16.

Figure 15:
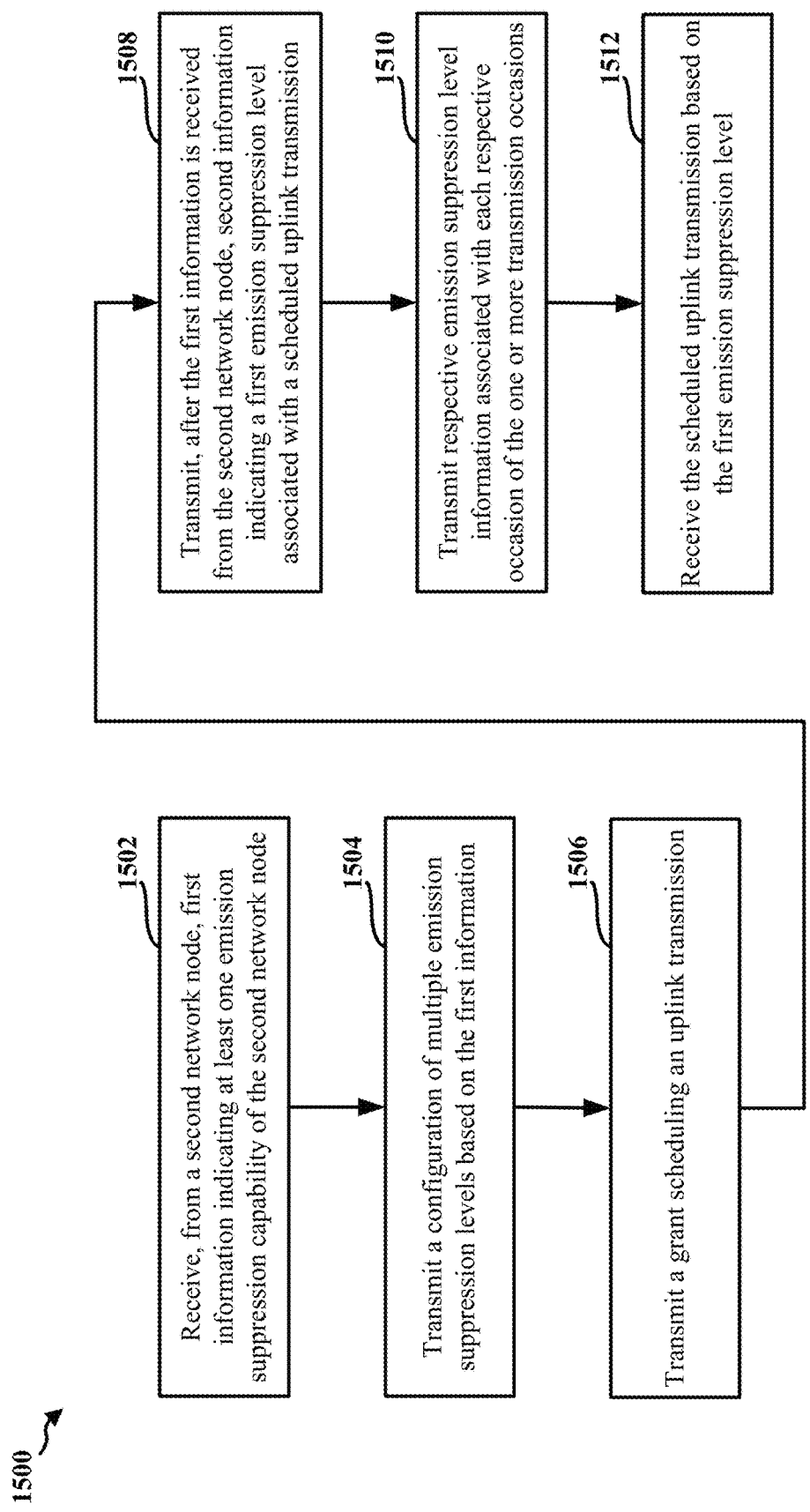
FIG. 15 is a flowchart of a method of wireless communication at a base station, in accordance with the teachings disclosed herein.

FIG. 15 is a flowchart 1500 of a method of wireless communication. The method may be performed by a first network node (e.g., the base station 102/180, the base station 310, and/or an apparatus 1602 of FIG. 16). The method may facilitate conserving processing resources and/or power resources by enabling a second network node to apply an emission suppression level for an uplink transmission based on an uplink grant associated with the uplink transmission.

At 1502, the first network node receives, from a second network node, first information indicating at least one emission suppression capability of the second network node, as described in connection with the capabilities message 710 of FIG. 7. In some examples, the first information includes at least one suppression amount supported by the second network node. The receiving of the first information, at 1502, may be performed by a capability component 1640 of the apparatus 1602 of FIG. 16.

At 1506, the first network node may transmit a grant scheduling the uplink transmission at the second network node, as described in connection with the uplink grant 730 of FIG. 7. The transmitting of the grant, at 1506, may be performed by a grant component 1642 of the apparatus 1602 of FIG. 16.

At 1508, the first network node transmits, after the first information is received from the second network node, second information indicating a first emission suppression level associated with a scheduled uplink transmission, as described in connection with the indicator 740 of FIG. 7. In some examples, the second information may exclude information indicative of an emission suppression level. In some examples, the second information may be a skipped indicator. The transmitting of the second information, at 1508, may be performed by an indicator component 1644 of the apparatus 1602 of FIG. 16.

At 1512, the first network node receives the scheduled uplink transmission based on the first emission suppression level, as described in connection with the uplink transmission 770 of FIG. 7. The receiving of the scheduled uplink transmission, at 1512, may be performed by an uplink component 1646 of the apparatus 1602 of FIG. 16.

At 1504, the first network node may transmit a configuration of multiple emission suppression levels based on the first information, where the multiple emission suppression levels include the first emission suppression level, as described in connection with the configuration 722 of FIG. 7, the configuration 800 of FIG. 8A, and/or the configuration 850 of FIG. 8B. In some examples, the multiple emission suppression levels may include a default emission suppression level. In some examples, a skipped indicator or excluded information may map to the default emission suppression level. The transmitting of the configuration, at 1504, may be performed by a configuration component 1648 of the apparatus 1602 of FIG. 16.

In some examples, the first network node may transmit the configuration via RRC signaling. In some examples, the configuration may indicate a relationship between the second information and the first emission suppression level of the multiple emission suppression levels, as described in connection with the example configuration 800 of FIG. 8A and/or the configuration 850 of FIG. 8B. In some examples, the second information (e.g., at 1508) may indicate a resource gap between a downlink transmission overlapping with the scheduled uplink transmission in a time-domain, as described in connection with the example configuration 850 and the resource gap indicators 852 of FIG. 8B. For example, the configuration may indicate a relationship between the resource gap of the second information to the first emission suppression level of the multiple emission suppression levels. In some examples, the resource gap may correspond to a minimum gap between one or more downlink transmissions overlapping with the scheduled uplink transmission in the time-domain, as described in connection with the example first resources gap 910 and the example second resources gap 912 of FIG. 9.

In some examples, the downlink transmission overlapping with the scheduled uplink transmission may be from the first network node to the second network node, as described in connection with the downlink transmission 772 of FIG. 7.

In some examples, the downlink transmission overlapping with the scheduled uplink transmission may be from the first network node to a third network node, as described in connection with the second downlink transmission 774 of FIG. 7.

In some examples, the first network node may transmit the grant scheduling the uplink transmission (e.g., at 1506) and the second information in a same transmission.

In some examples, the grant scheduling the uplink transmission (e.g., at 1506) may include a configured grant configuring one or more transmission occasions, the one or more transmission occasions including at least the scheduled uplink transmission, as described in connection with the example of FIG. 10. In some examples, at 1510, the first network node may transmit respective emission suppression level information associated with each respective occasion of the one or more transmission occasions, as described in connection with the first indicator 1020, the second indicator 1022, and/or the third indicator 1024 of FIG. 10. The transmitting of the respective emission suppression level information, at 1510, may be performed by the indicator component 1644 of the apparatus 1602 of FIG. 16.

In some examples, the first network node may transmit the respective emission suppression level information (e.g., the first indicator 1020, the second indicator 1022, and/or the third indicator 1024) and a configured grant activator in a same transmission. In some examples, the first network node may transmit the respective emission suppression level information (e.g., the first indicator 1020, the second indicator 1022, and/or the third indicator 1024) before a respective instance of the one or more transmission occasions in a time-domain.

Figure 16:
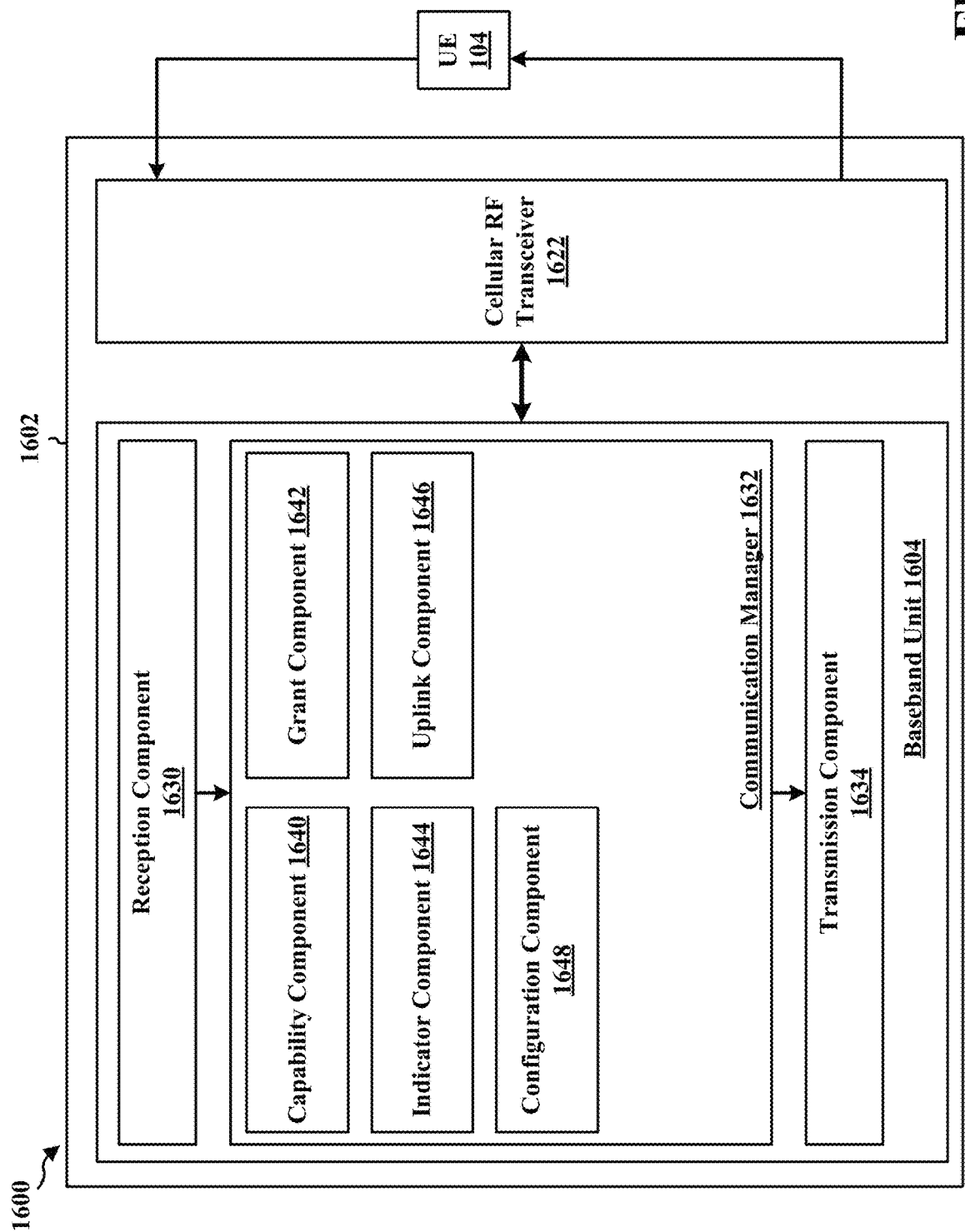
FIG. 16 is a diagram illustrating an example of a hardware implementation for an example apparatus, in accordance with the teachings disclosed herein.

FIG. 16 is a diagram 1600 illustrating an example of a hardware implementation for an apparatus 1602. The apparatus 1602 may be a base station, a component of a base station, or may implement base station functionality. In some aspects, the apparatus 1602 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a capability component 1640 that is configured to receive, from a second network node, first information indicating at least one emission suppression capability of the second network node, for example, as described in connection with 1402 of FIGS. 14 and/or 1502 of FIG. 15.

The communication manager 1632 also includes a grant component 1642 that is configured to transmit a grant scheduling the uplink transmission at the second network node, for example, as described in connection with 1506 of FIG. 15.

The communication manager 1632 also includes an indicator component 1644 that is configured to transmit, after the first information is received from the second network node, second information indicating a first emission suppression level associated with a scheduled uplink transmission, for example, as described in connection with 1404 of FIGS. 14 and/or 1508 of FIG. 15. The example indicator component 1644 may also be configured to transmit respective emission suppression level information associated with each respective occasion of the one or more transmission occasions, as described in connection with 1510 of FIG. 15.

The communication manager 1632 also includes an uplink component 1646 that is configured to receive the scheduled uplink transmission based on the first emission suppression level, for example, as described in connection with 1406 of FIGS. 14 and/or 1512 of FIG. 15.

The communication manager 1632 also includes a configuration component 1648 that is configured to transmit a configuration of multiple emission suppression levels based on the first information, where the multiple emission suppression levels include the first emission suppression level, for example, as described in connection with 1504 of FIG. 15.

The apparatus may include additional components that perform each of the blocks of the algorithm in the flowcharts of FIG. 14 and/or FIG. 15. As such, each block in the flowcharts of FIG. 14 and/or FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for receiving, from a second network node, first information indicating at least one emission suppression capability of the second network node. The example apparatus 1602 also includes means for transmitting, after the first information is received from the second network node, second information indicating a first emission suppression level associated with a scheduled uplink transmission. The example apparatus 1602 also includes means for receiving the scheduled uplink transmission based on the first emission suppression level.

In another configuration, the example apparatus 1602 also includes means for transmitting a configuration of multiple emission suppression levels based on the first information, where the multiple emission suppression levels include the first emission suppression level.

In another configuration, the example apparatus 1602 also includes means for transmitting the configuration via RRC signaling.

In another configuration, the example apparatus 1602 also includes means for transmitting the grant and the second information in a same transmission.

In another configuration, the example apparatus 1602 also includes means for transmitting respective emission suppression level information associated with each respective occasion of the one or more transmission occasions.

In another configuration, the example apparatus 1602 also includes means for transmitting respective emission suppression level information and a configured grant activator in a same transmission.

In another configuration, the example apparatus 1602 also includes means for transmitting respective emission suppression level information before a respective instance of the one or more transmission occasions in a time-domain.

The means may be one or more of the components of the apparatus 1602 configured to perform the functions recited by the means. As described supra, the apparatus 1602 may include the TX processor 316, the RX processor 370, and the controller/processor 375. As such, in one configuration, the means may be the TX processor 316, the RX processor 370, and the controller/processor 375 configured to perform the functions recited by the means.

Aspects disclosed herein provide techniques for indicating emission suppression levels depending on a transmission scenario that enables the UE to conserve power resources. For example, techniques disclosed herein may dynamically indicate an emission suppression level that the UE is to satisfy for an uplink transmission. In some examples, the UE may receive the indication of the emission suppression level with a grant for an uplink transmission. For example, when the UE receives an uplink grant, DCI scheduling the uplink grant may indicate the emission suppression level to be applied to the uplink grant.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is a method of wireless communication performed by a first network node, including: transmitting, to a second network node, first information indicating at least one emission suppression capability of the first network node; receiving, after the first information is transmitted to the second network node, second information indicating a first emission suppression level associated with a scheduled uplink transmission; and transmitting the scheduled uplink transmission based on the first emission suppression level.

Aspect 2 is the method of aspect 1, further including that the first information includes at least one suppression amount supported by the first network node.

Aspect 3 is the method of any of aspects 1 and 2, further including: receiving a configuration of multiple emission suppression levels based on the first information, where the multiple emission suppression levels include the first emission suppression level.

Aspect 4 is the method of any of aspects 1 to 3, further including that the first network node receives the configuration via RRC signaling.

Aspect 5 is the method of any of aspects 1 to 4, further including that the configuration indicates a relationship between the second information and the first emission suppression level of the multiple emission suppression levels.

Aspect 6 is the method of any of aspects 1 to 5, further including that the second information indicates a resource gap between a downlink transmission overlapping with the scheduled uplink transmission in a time-domain.

Aspect 7 is the method of any of aspects 1 to 6, further including that the configuration indicates a relationship between the resource gap of the second information to the first emission suppression level of the multiple emission suppression levels.

Aspect 8 is the method of any of aspects 1 to 7, further including that the downlink transmission is from the second network node to the first network node.

Aspect 9 is the method of any of aspects 1 to 7, further including that the downlink transmission is from the second network node to a third network node.

Aspect 10 is the method of any of aspects 1 to 9, further including: receiving resource information from the third network node, the resource information indicating one or more downlink reception resources associated with the downlink transmission to the third network node.

Aspect 11 is the method of any of aspects 1 to 10, further including that the resource gap corresponds to a minimum gap between one or more downlink transmissions overlapping with the scheduled uplink transmission in the time-domain.

Aspect 12 is the method of any of aspects 1 to 11, further including: receiving a configuration of multiple emission suppression levels, where the multiple emission suppression levels include a default emission suppression level; and transmitting a second scheduled uplink transmission based on the default emission suppression level.

Aspect 13 is the method of any of aspects 1 to 12, further including: receiving a grant scheduling the scheduled uplink transmission and the second information in a same transmission.

Aspect 14 is the method of any of aspects 1 to 13, further including: receiving a grant scheduling the scheduled uplink transmission, the grant including a configured grant configuring one or more transmission occasions, the one or more transmission occasions including at least the scheduled uplink transmission.

Aspect 15 is the method of any of aspects 1 to 14, further including: receiving respective emission suppression level information associated with each respective occasion of the one or more transmission occasions.

Aspect 16 is the method of any of aspects 1 to 15, further including: receiving respective emission suppression level information and a configured grant activator in a same transmission.

Aspect 17 is the method of any of aspects 1 to 15, further including: receiving respective emission suppression level information before a respective instance of the one or more transmission occasions in a time-domain.

Aspect 18 is the method of any of aspects 1 to 15, further including that the multiple emission suppression levels include a default emission suppression level.

Aspect 19 is an apparatus for wireless communication at a UE including at least one processor coupled to a memory and configured to implement any of aspects 1 to 18.

Aspect 20 is an apparatus for wireless communication including means for implementing any of aspects 1 to 18.

Aspect 21 is a non-transitory computer-readable storage medium storing computer executable code, where the code, when executed, causes a processor to implement any of aspects 1 to 18.

Aspect 22 is a method of wireless communication performed by a first node, including: receiving, from a second network node, first information indicating at least one emission suppression capability of the second network node; transmitting, after the first information is received from the second network node, second information indicating a first emission suppression level associated with a scheduled uplink transmission; and receiving the scheduled uplink transmission based on the first emission suppression level.

Aspect 23 is the method of aspect 22, further including that the first information includes at least one suppression amount supported by the second network node.

Aspect 24 is the method of any of aspects 22 and 23, further including: transmitting a configuration of multiple emission suppression levels based on the first information, where the multiple emission suppression levels include the first emission suppression level.

Aspect 25 is the method of any of aspects 22 to 24, further including transmitting the configuration via RRC signaling.

Aspect 26 is the method of any of aspects 22 to 25, further including that the configuration indicates a relationship between the second information and the first emission suppression level of the multiple emission suppression levels.

Aspect 27 is the method of any of aspects 22 to 24, further including that the second information indicates a resource gap between a downlink transmission overlapping with the scheduled uplink transmission in a time-domain.

Aspect 28 is the method of any of aspects 22 to 27, further including that the configuration indicates a relationship between the resource gap of the second information to the first emission suppression level of the multiple emission suppression levels.

Aspect 29 is the method of any of aspects 22 to 28, further including that the downlink transmission is from the first network node to the second network node.

Aspect 30 is the method of any of aspects 22 to 28, further including that the downlink transmission is from the first network node to a third network node.

Aspect 31 is the method of any of aspects 22 to 30, further including that the resource gap corresponds to a minimum gap between one or more downlink transmissions overlapping with the scheduled uplink transmission in the time-domain.

Aspect 32 is the method of any of aspects 22 to 31, further including: transmitting a grant scheduling the scheduled uplink transmission and the second information in a same transmission.

Aspect 33 is the method of any of aspects 22 to 32, further including: transmitting a grant scheduling the scheduled uplink transmission, the grant including a configured grant configuring one or more transmission occasions, the one or more transmission occasions including at least the scheduled uplink transmission.

Aspect 34 is the method of any of aspects 22 to 33, further including: transmitting respective emission suppression level information associated with each respective occasion of the one or more transmission occasions.

Aspect 35 is the method of any of aspects 22 to 34, further including: transmitting the respective emission suppression level information and a configured grant activator in a same transmission.

Aspect 36 is the method of any of aspects 22 to 34, further including: transmitting the respective emission suppression level information before a respective instance of the one or more transmission occasions in a time-domain.

Aspect 37 is the method of any of aspects 22 to 36, further including: transmitting a configuration of multiple emission suppression levels based on the first information, where the multiple emissions suppression levels include a default emission suppression level; and receiving a second scheduled uplink transmission based on the default emission level.

Aspect 38 is the method of any of aspects 22 to 37, further including that the multiple emission suppression levels include a default emission suppression level.

Aspect 39 is an apparatus for wireless communication at a base station including at least one processor coupled to a memory and configured to implement any of aspects 22 to 38.

Aspect 40 is an apparatus for wireless communication including means for implementing any of aspects 22 to 38.

Aspect 41 is a non-transitory computer-readable storage medium storing computer executable code, where the code, when executed, causes a processor to implement any of aspects 22 to 38.

What is claimed is:

1. A first network node for wireless communication, comprising:
   a memory; and
   at least one processor communicatively coupled to the memory, wherein the at least one processor is configured to:
   transmit, to a second network node, first information indicating at least one emission suppression capability of the first network node;
   receive, after the first information is transmitted to the second network node, downlink control information (DCI) including second information indicating a first emission suppression level associated with a scheduled uplink transmission; and
   transmit the scheduled uplink transmission based on the first emission suppression level.

2. The first network node of claim 1, wherein the at least one emission suppression capability includes at least one suppression amount supported by the first network node.

3. The first network node of claim 1, wherein the at least one processor is configured to:
   receive a configuration of multiple emission suppression levels based on the first information, wherein the multiple emission suppression levels include the first emission suppression level.

4. The first network node of claim 3, wherein the configuration indicates a relationship between the second information and the first emission suppression level of the multiple emission suppression levels.

5. The first network node of claim 3, wherein the second information comprises an indicator for a resource gap in frequency that maps to the first emission suppression level, wherein the resource gap is between a downlink transmission overlapping with the scheduled uplink transmission in a time-domain.

6. The first network node of claim 5, wherein the configuration indicates a relationship between the resource gap of the second information to the first emission suppression level of the multiple emission suppression levels.

7. The first network node of claim 5, wherein the downlink transmission is from the second network node to a third network node, and wherein the at least one processor is configured to:
   receive resource information from the third network node, the resource information indicating one or more downlink reception resources associated with the downlink transmission to the third network node.

8. The first network node of claim 5, wherein the resource gap corresponds to a minimum gap in frequency between one or more downlink transmissions overlapping with the scheduled uplink transmission in the time-domain.

9. The first network node of claim 3, wherein the multiple emission suppression levels include a default emission suppression level.

10. The first network node of claim 1, wherein the at least one processor is configured to:
    receive a configuration of multiple emission suppression levels based on the first information, wherein the multiple emission suppression levels include a default emission suppression level; and
    transmit a second scheduled uplink transmission based on the default emission suppression level.

11. The first network node of claim 1, wherein the DCI includes the second information and a grant scheduling the scheduled uplink transmission.

12. The first network node of claim 1, wherein the at least one processor is configured to receive a grant scheduling the scheduled uplink transmission, the grant including a configured grant configuring one or more transmission occasions, the one or more transmission occasions including at least the scheduled uplink transmission.

13. The first network node of claim 12, wherein the at least one processor is configured to:
    receive respective emission suppression level information associated with each respective occasion of the one or more transmission occasions.

14. The first network node of claim 1, wherein the first emission suppression level associated with the scheduled uplink transmission is based on a gap in frequency between the scheduled uplink transmission and downlink resources scheduled to overlap in time with the scheduled uplink transmission.

15. The first network node of claim 1, wherein the at least one processor is further configured to:
    receive an additional DCI indicating a second emission suppression level associated with an additional uplink transmission; and
    transmit the additional uplink transmission based on the second emission suppression level.

16. A method of wireless communication performed by a first network node, comprising:
    transmitting, to a second network node, first information indicating at least one emission suppression capability of the first network node;
    receiving, after the first information is transmitted to the second network node, downlink control information (DCI) including second information indicating a first emission suppression level associated with a scheduled uplink transmission; and
    transmitting the scheduled uplink transmission based on the first emission suppression level.

17. The method of claim 16, further comprising:
    receiving a configuration of multiple emission suppression levels based on the first information, wherein the multiple emission suppression levels include the first emission suppression level.

18. The method of claim 16, further comprising:
    receiving a grant scheduling the scheduled uplink transmission, the grant including a configured grant configuring one or more transmission occasions, the one or more transmission occasions including at least the scheduled uplink transmission.

19. The method of claim 18, further comprising:
receiving respective emission suppression level information associated with each respective occasion of the one or more transmission occasions.

20. A first network node for wireless communication, comprising:
a memory; and
at least one processor communicatively coupled to the memory, wherein the at least one processor is configured to:
receive, from a second network node, first information indicating at least one emission suppression capability of the second network node;
transmit, after the first information is received from the second network node, downlink control information (DCI) including second information indicating a first emission suppression level associated with a scheduled uplink transmission; and
receive the scheduled uplink transmission based on the first emission suppression level.

21. The first network node of claim 20, wherein the at least one emission suppression capability includes at least one suppression amount supported by the second network node.

22. The first network node of claim 20, wherein the at least one processor is configured to:
transmit a configuration of multiple emission suppression levels based on the first information, wherein the multiple emission suppression levels include the first emission suppression level.

23. The first network node of claim 22, wherein the configuration indicates a relationship between the second information and the first emission suppression level of the multiple emission suppression levels.

24. The first network node of claim 22, wherein the second information comprises an indicator for a resource gap in frequency that maps to the first emission suppression level, wherein the resource gap is between a downlink transmission overlapping with the scheduled uplink transmission in a time-domain.

25. The first network node of claim 24, wherein the configuration indicates a relationship between the resource gap of the second information to the first emission suppression level of the multiple emission suppression levels.

26. The first network node of claim 24, wherein the resource gap corresponds to a minimum gap in frequency between one or more downlink transmissions overlapping with the scheduled uplink transmission in the time-domain.

27. The first network node of claim 20, wherein the DCI includes the second information and a grant scheduling the scheduled uplink transmission.

28. The first network node of claim 20, wherein the at least one processor is configured to transmit a grant scheduling the scheduled uplink transmission, the grant including a configured grant configuring one or more transmission occasions, the one or more transmission occasions including at least the scheduled uplink transmission.

29. The first network node of claim 28, wherein the at least one processor is configured to:
transmit respective emission suppression level information associated with each respective occasion of the one or more transmission occasions.

30. A method of wireless communication performed by a first network node, comprising:
receiving, from a second network node, first information indicating at least one emission suppression capability of the second network node;
transmitting, after the first information is received from the second network node, downlink control information (DCI) including second information indicating a first emission suppression level associated with scheduled uplink transmission; and
receiving the scheduled uplink transmission based on the first emission suppression level.

31. The method of claim 30, further comprising:
transmitting a configuration of multiple emission suppression levels based on the first information, wherein the multiple emission suppression levels include the first emission suppression level.

32. The method of claim 30, further comprising:
transmitting a grant scheduling the scheduled uplink transmission, the grant including a configured grant configuring one or more transmission occasions, the one or more transmission occasions including at least the scheduled uplink transmission; and
transmitting respective emission suppression level information associated with each respective occasion of the one or more transmission occasions.

* * * * *